(12) United States Patent
Torii et al.

(10) Patent No.: US 7,378,473 B2
(45) Date of Patent: May 27, 2008

(54) PROCESS FOR PRODUCING COLORED SPHERICAL POLYMER PARTICLES

(75) Inventors: Toru Torii, 18-18, Ogikubo 4-chome, Suginami-ku, Tokyo (JP) 167-0051; Toshiro Higuchi, 4-26, Eda-Higashi 3-chome, Tsuzuki-ku, Yokohama-shi, Kanagawa (JP) 224-0006; Takasi Nisisako, Taito-ku (JP); Youichi Takizawa, Sayama (JP); Takanori Takahashi, Sayama (JP)

(73) Assignees: Soken Chemical & Engineering Co., Ltd. (JP); Toru Torii (JP); Toshiro Higuchi (JP)

( * ) Notice: Subject to any disclaimer, the term of this patent is extended or adjusted under 35 U.S.C. 154(b) by 348 days.

(21) Appl. No.: 10/537,602

(22) PCT Filed: Dec. 5, 2003

(86) PCT No.: PCT/JP03/15592

§ 371 (c)(1),
(2), (4) Date: Jun. 3, 2005

(87) PCT Pub. No.: WO2004/052941

PCT Pub. Date: Jun. 24, 2004

(65) Prior Publication Data

US 2006/0014894 A1    Jan. 19, 2006

(30) Foreign Application Priority Data

Dec. 6, 2002  (JP) .............................. 2002-355419
Nov. 21, 2003 (JP) .............................. 2003-391544

(51) Int. Cl.
*C08F 2/22*   (2006.01)
*C08F 2/32*   (2006.01)
*C08F 20/00*  (2006.01)
*C08J 3/16*   (2006.01)

(52) U.S. Cl. .................... 526/88; 526/89; 524/801; 137/3; 516/77

(58) Field of Classification Search ............... 526/88, 526/89; 524/801; 137/3; 516/77
See application file for complete search history.

(56) References Cited

U.S. PATENT DOCUMENTS 3,612,758 A    10/1971   Evans et al.

(Continued)

FOREIGN PATENT DOCUMENTS

JP       64-042683 A      2/1989

(Continued)

*Primary Examiner*—Kelechi C. Egwim
(74) *Attorney, Agent, or Firm*—The Webb Law Firm, P.C.

(57) ABSTRACT

Monodisperse colored spherical particles each having two separated color regions of two hues, that is, two-colored spherical particles, useful, for example, for displays of characters, graphics, images and the like, the two hues being for reverse display in terms of electricity and magnetism from the viewpoint of good suitability for display are provided. In the production process and the apparatus for producing the colored spherical polymer particles, microchannels are utilized including a first microchannel through which a colored continuous phase comprising a color dye/pigment dispersed in a fluid dispersing medium containing a polymerizable resin component and having colored phases of different hues is transferred, and a second microchannel through which a spheroidizing disperse phase flows. The process and apparatus spheroidizes the discharged colored continuous phase having two hues and cures the polymerizable resin component in the colored continuous phase, whereby colored spherical polymer particles are formed.

12 Claims, 11 Drawing Sheets

U.S. PATENT DOCUMENTS

| | | |
|---|---|---|
| 6,488,872 B1 | 12/2002 | Beebe et al. |
| 6,492,471 B1 | 12/2002 | Eisenbeiss et al. |
| 6,844,009 B1 | 1/2005 | Degert et al. |

FOREIGN PATENT DOCUMENTS

| | | | |
|---|---|---|---|
| JP | 4-243267 A | | 8/1992 |
| JP | 9-185087 A | | 7/1997 |
| JP | 11-352421 A | | 12/1999 |
| JP | 2000-122103 A | | 4/2000 |
| JP | 2001-89510 A | | 4/2001 |
| JP | 2001-181309 A | | 7/2001 |
| JP | 2001-249366 A | | 9/2001 |
| JP | 2002-539150 A | | 11/2002 |
| JP | 2003/290647 A | * | 10/2003 |
| JP | 2003-290647 A | | 10/2003 |
| JP | 2004-59802 A | | 2/2004 |
| WO | WO 00/68300 A | | 11/2000 |
| WO | WO 01/07506 A2 | | 2/2001 |
| WO | WO 03/037501 A1 | | 5/2003 |

* cited by examiner

Fig. 3
(a)
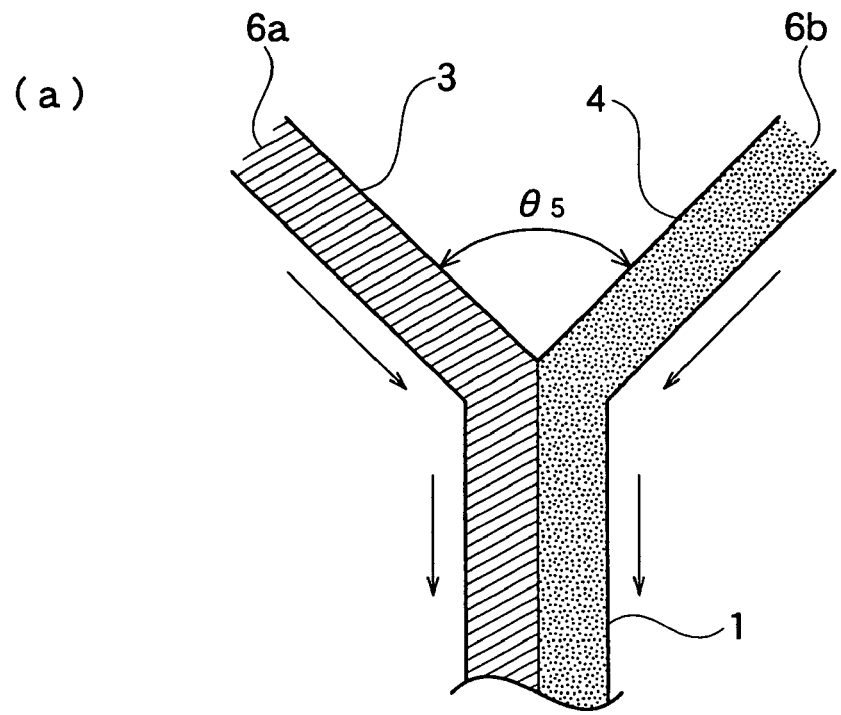
(b)
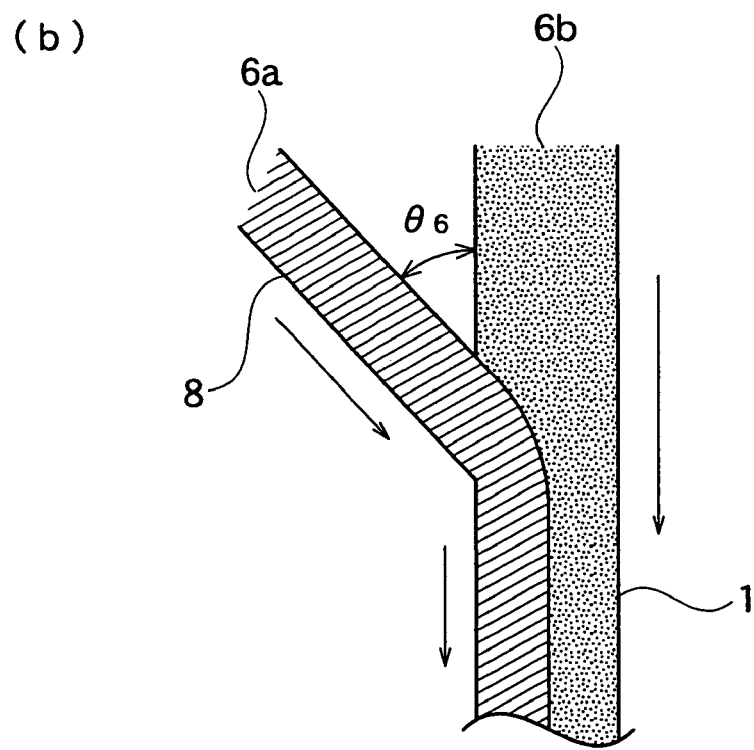

Fig. 6
(a)
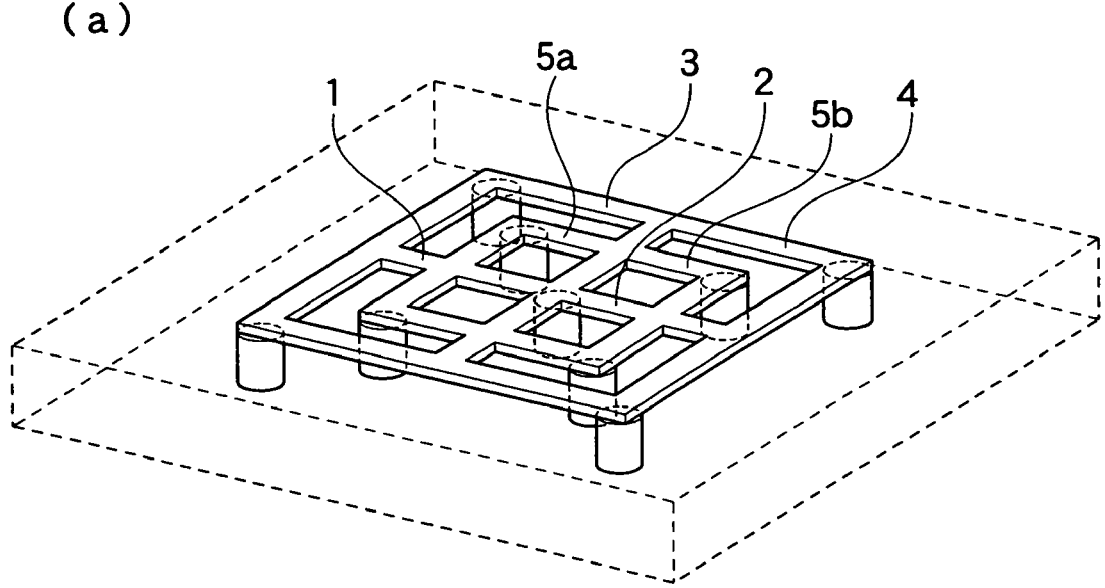
(b)
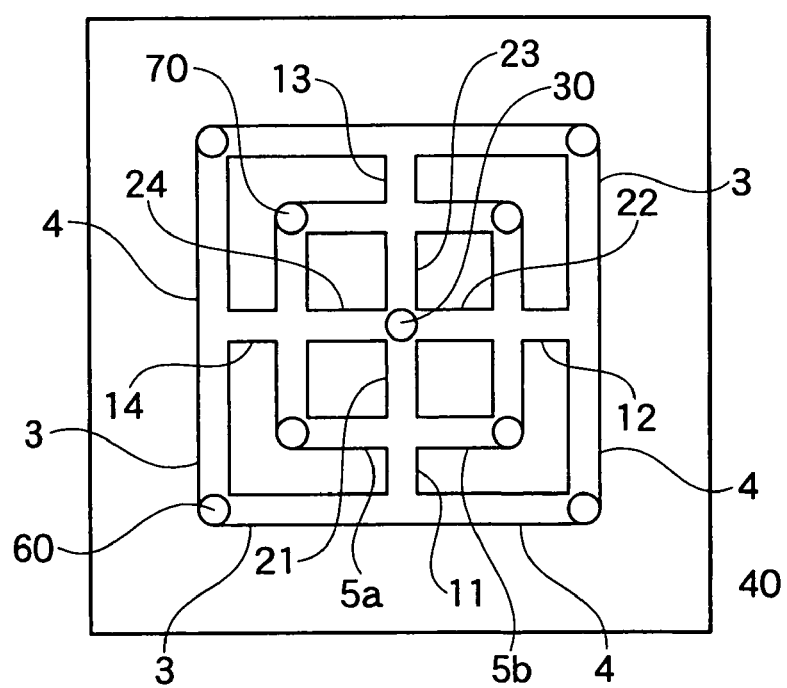

Fig. 7
(a)
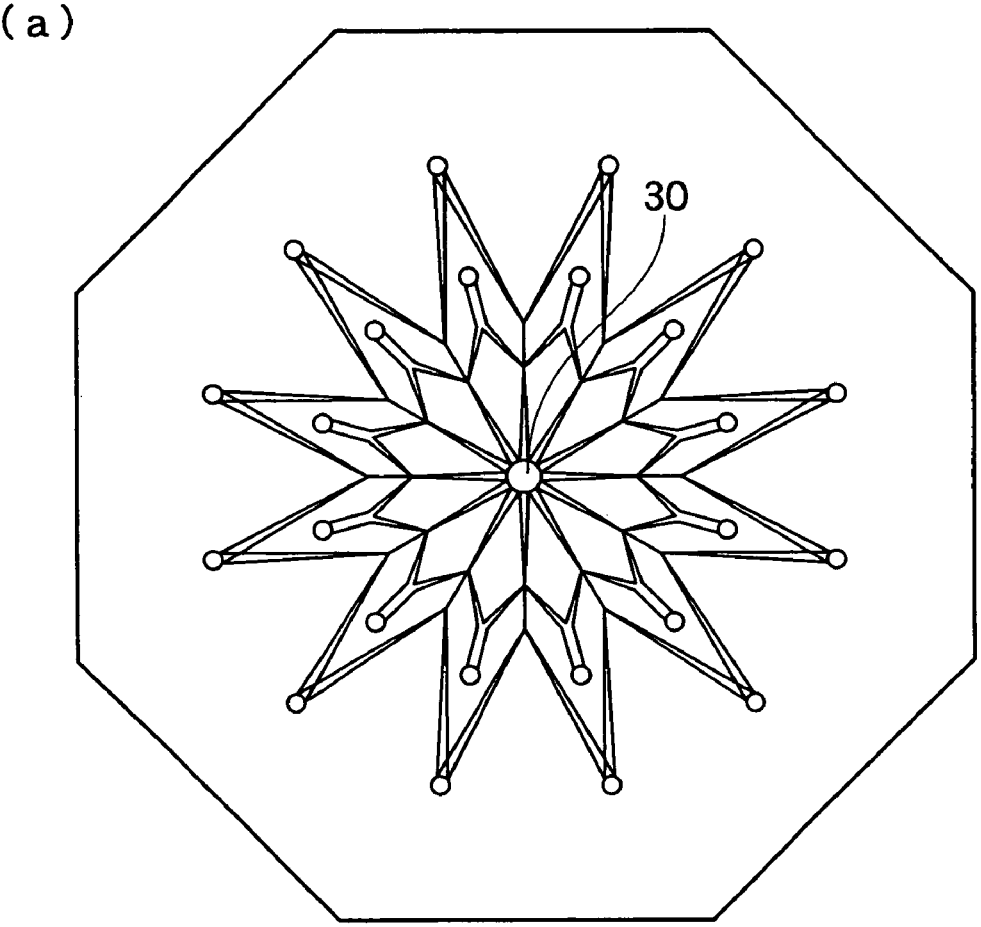
(b)
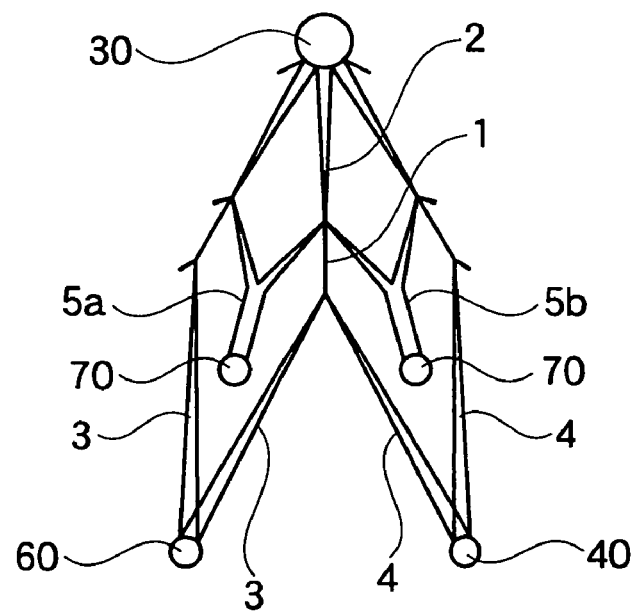

Fig. 8
(a)
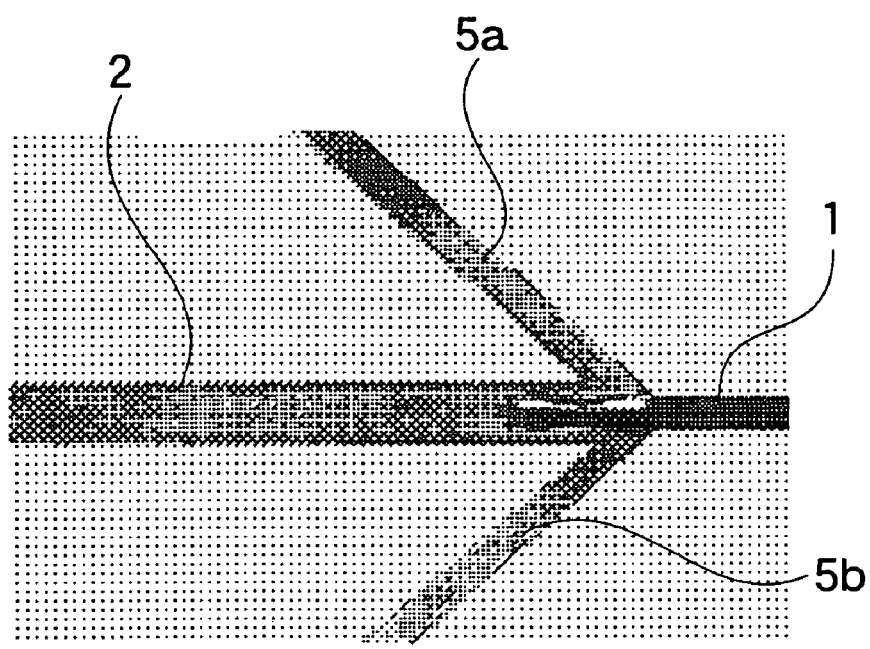
(b)
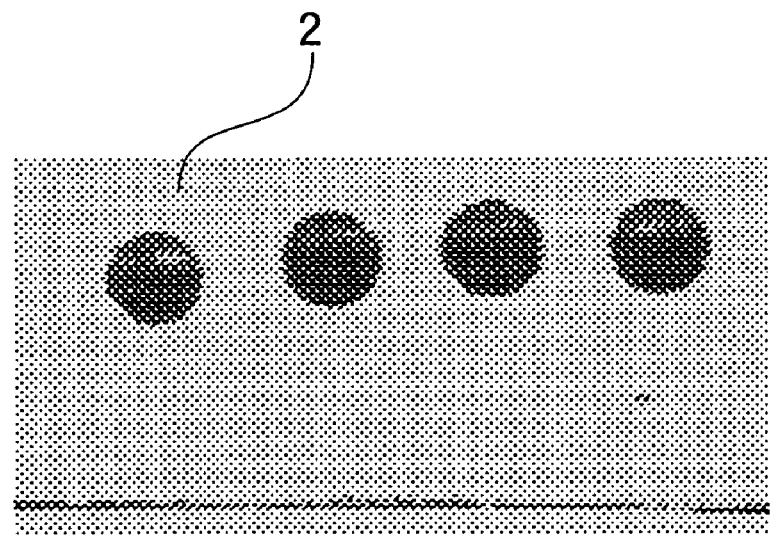

Fig. 11
(a)
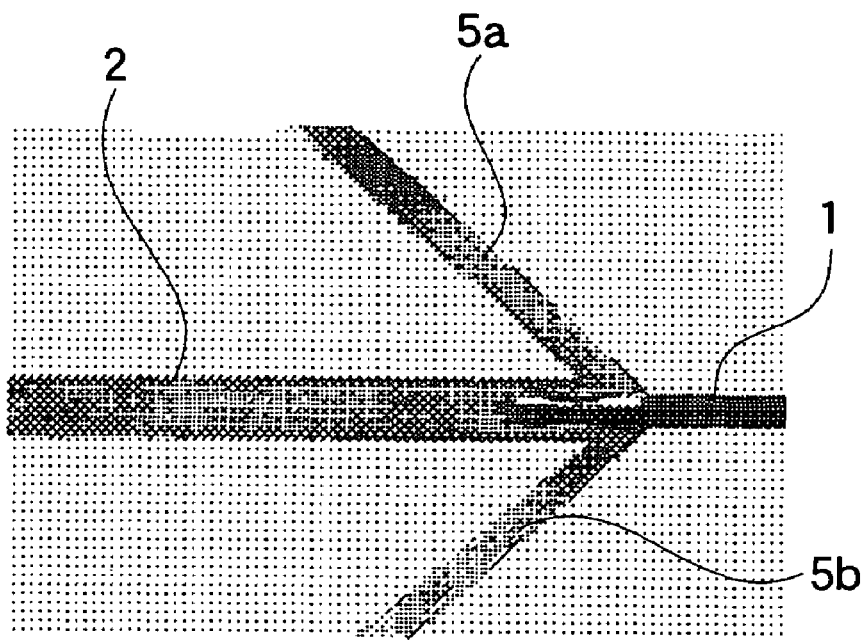
(b)
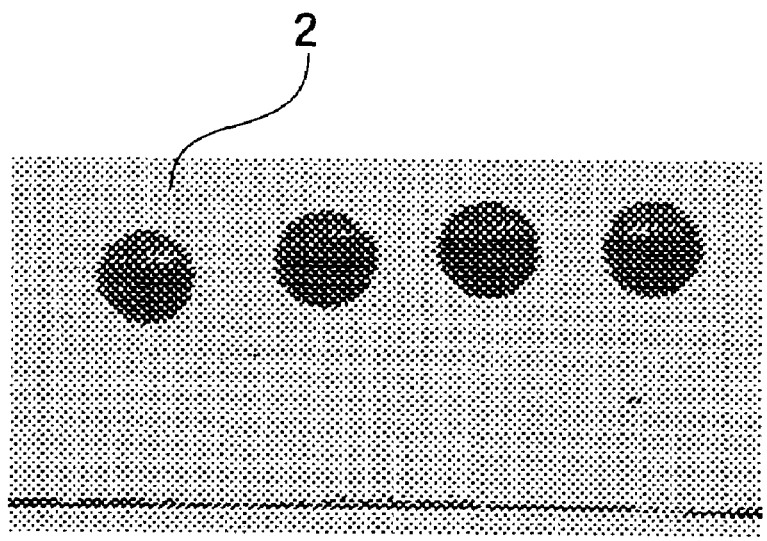

PROCESS FOR PRODUCING COLORED SPHERICAL POLYMER PARTICLES

TECHNICAL FIELD

The present invention relates to a process and apparatus for producing colored spherical particles. More particularly, the present invention relates to a novel process and apparatus for producing colored spherical fine particles which are useful for use, for example, in character materials, graphic materials and displays such as image displays, particularly colored spherical particles which are of a single color or multi-hue of two or more colors and have a narrow particle diameter distribution.

The present invention also relates to a novel process and apparatus for producing colored spherical particles which are used in image display devices, comprise a colored phase of two hues from the viewpoint of display properties, and possess excellent electric or magnetic reverse display properties by virtue of their excellent electrification and magnetic properties.

BACKGROUND ART

In recent years, a wide variety of types of information are output as records, storage, transmission, and displays to the society. There are a number of output forms of information, and examples thereof include: displays such as CRTs, PDPs, and LCDs; records, storages, and displays on paper (hardcopy) by electrophotographic images such as in copying machines, facsimiles, and printers; and transmissions and displays, for example, by portable telephones or cellular phones and DTAs, and, further, displays of images by electrophoresis of electrifiable black and white colored particles such as PLDs.

Under these circumstances, regarding electrophoresis of electrofiable colored resin fine particles which are electrified within an electrophoretic display cell, electrophoretic display devices are proposed in Japanese Patent Laid-Open No. 185087/1997 (patent document 1), U.S. Pat. No. 3,612,758 (patent document 2), and Japanese Patent Laid-Open No. 249366/2001 (patent document 3). For example, Japanese Patent Laid-Open No. 249366/2001 (patent document 3) proposes an electrophoretic display device which can realize display contrast by simple matrix drive. This publication describes black and white colored electrification electrophoretic fine particles such as polystyrene and polyethylene filled into a cell of a transparent organic insulating liquid such as silicone oil, toluene, xylene, or high-purity petroleum.

Regarding such colored resin fine particles, Japanese Patent Laid-Open No. 89510/2001 (patent document 4) describes acrylic colored resin fine particles (average particle diameter: 0.5 to 100 µm) containing an oil-soluble dye and further discloses colored resin fine particles of, for example, a copolymer of an (meth)acrylic monomer with a styrenic monomer. These colored resin fine particles are prepared by absorbing an acrylic monomer containing an alkyl group such as methyl, ethyl, propyl, butyl, isobutyl, 2-ethylhexyl, lauryl, cyclohexyl, 2-hydroxyethyl, methoxyethyl, or glycidyl, and an oil-soluble dye in seed particles of a polymer with an average particle diameter of 0.05 to 1 µm, prepared, e.g., by emulsion or suspension polymerization using a dispersion of an aqueous medium, such as a (co) polymer of an (meth)acrylic monomer, a styrenic (co)polymer, a copolymer of an (meth)acrylic monomer with a styrenic monomer, and conducting polymerization.

Further, in Japanese Patent Laid-Open No. 243267/1992 (patent document 5), blue, yellow, red or other dye-containing colored resin particles, with a particle diameter of 6 to 8 µm, of a styrene-(meth)acrylic copolymer of styrene with methyl acrylate, n-butyl methacrylate, 2-ethylhexylmethacrylate are described as toner particles for electrostatic image development. These particles are proposed as resin particles that exhibit charging characteristics of −25 to −30 (µc/g) in terms of amount of electrification as measured by the blow-off method. These particles are prepared by adding thermoplastic resin particles, prepared by polymerization and growth according to a seed polymerization method or a suspension polymerization method, in a system of a dye as a colorant dissolved in an alcoholic solvent to color the resin particles with the dye.

Japanese Patent Laid-Open No. 42683/1989 (patent document 6) describes a particle rotation-type display device. The rotation particles for display which have two separated color regions disclosed in this document are prepared by adding titanium oxide to wax, granulating the mixture by a spray drier method, classifying the particles, and then spraying, for coloring, a carbon black-dispersed alkyd resin enamel onto the hemispherical surface of white wax particles with an average particle diameter of 50 µm. A green pigment is dispersed in wax, a red pigment is dispersed in wax, and a blue pigment is dispersed in wax. The green pigment-dispersed wax, the red pigment-dispersed wax, and the blue pigment-dispersed wax were granulated to prepare respective particles. These particles are classified to prepare green particles with an average particle diameter of 30 to 150 µm, blue particles with an average particle diameter of 30 to 150 µm, and red particles with an average particle diameter of 30 to 150 µm which are then dispersed in RTV rubber. The rubber mass is subjected to color separation while heating at 90° C. under centrifugal force. After cooling, color separated display particles are recovered from thinly cut rubber.

Japanese Patent Laid-Open No. 352421/1999 (patent document 7) discloses a process for producing two-color color separated display rotation particles for use in display of PLDs and the like. In this production process, different color layers are formed on hemispherical surfaces of microballs by a thin-film preparation method such as a vacuum deposition method, a sputtering method, a chemical vapor deposition method, or a spinner coating method.

Japanese Patent Laid-Open No. 122103/2000 (patent document 8) describes rotatable electrifiable electrophoretic color balls of two colors of black and white provided within microcapsules. These two-color balls are prepared by preparing white titanium dioxide-filled glass beads and plastic beads and then vacuum-depositing a mixture of antimony sulfide with magnesium fluoride as a black material onto the hemispherical surfaces.

[Patent document 1] Japanese Patent Laid-Open No. 185087/1997

[Patent document 2] U.S. Pat. No. 3,612,758

[Patent document 3] Japanese Patent Laid-Open No. 249366/2001

[Patent document 4] Japanese Patent Laid-Open No. 89510/2001

[Patent document 5] Japanese Patent Laid-Open No. 243267/1992

[Patent document 6] Japanese Patent Laid-Open No. 42683/1989

[Patent document 7] Japanese Patent Laid-Open No. 352421/1999

[Patent document 8] Japanese Patent Laid-Open No. 122103/2000

SUMMARY OF THE INVENTION

Under these circumstances, various color particles of two colors for display, which are used in various display devices in such a manner that particles of two hues, for example, black and white spherical particles are reversed for display, have hitherto been proposed. Japanese Patent Laid-Open No. 89510/2001 (patent document 4) and Japanese Patent Laid-Open No. 243267/1992 (patent document 5) propose production processes of a number of colored resin spherical particles having excellent monodispersibility in one step by including a dye/pigment (a dye or a pigment) in spherical resin particles while forming spherical resin particles by a film emulsification method such as in emulsion polymerization in a liquid medium system, thereby coloring the particles. In these production processes, however, all the particles produced are single-color resin particles.

On the other hand, Japanese Patent Laid-Open No. 352421/1999 (patent document 7) and Japanese Patent Laid-Open No. 122103/2000 (patent document 8) propose production processes in which a black component is coated onto hemispherical surfaces of previously prepared white particles, for example, by sputtering or vacuum deposition. Unlike the sputtering, the vacuum deposition method or the like, the production process described in Japanese Patent Laid-Open No. 42683/1989 (patent document 6) is not a production process in which the formation of two hues is likely to increase the cost. In forming particles, however, a spray dryer method is adopted. As well known in the art, in general, the particles formed by this method have a broad particle size distribution and thus require classification, and yield and monodispersibility of the particles are significantly poor. Further, the formation of two hues by the proposed two-step process is also disadvantageously very complicated or suffers from other problems. Therefore, all the proposed production processes are not satisfactory for the production of two-color colored spherical particles.

Accordingly, an object of the present invention is to provide a process and apparatus for producing colored spherical polymer particles, in a very simple manner and in a good yield, that are used in character materials and graphic materials, and particularly in various display devices, have achromatic colors of black and white or have two or three hues selected from chromatic colors such as red, blue, green, purple, and yellow, and possess excellent monodispersibility.

Another object of the present invention is to provide a process and apparatus for producing two-hue colored spherical polymer particles that are excellent in reverse display properties, for example, within an electric field display cell or within a magnetic field display cell by virtue of their electrification or magnetic properties from the viewpoint of display properties in display devices such as PLDs.

The present inventors have made extensive and intensive studies with a view to solving the above problems of the prior art and have aimed at the fact that, in a conventional O/W or W/O dispersion system, upon dispersion of droplets of O phase or W phase in W phase or O phase, interfacial tension created in the deformation of the droplets serves as shearing force and, consequently, the droplets are spontaneously brought to spheres. As a result, they have found that, in a dispersion system having an O/W relation, upon the discharge of a flowable O phase comprising a blue dye dispersed in a polymerizable resin into a W phase which is allowed to flow at a predetermined flow rate, the droplets are polymerized while being smoothly brought to spheres to form blue colored spherical particles, which has led to the completion of the present invention.

According to the present invention, there is provided a process for producing colored spherical polymer particles, characterized by using microchannels including a first microchannel through which a colored continuous phase is transferred and a second microchannel through which a spheroidizing phase of a fluid medium flows, said colored continuous phase and said spheroidizing phase being in an O/W (oil-in-water) or W/O (water-in-oil) relationship with each other, said colored continuous phase of one or at least two hues being successively discharged from said first microchannel either continuously or intermittently into said spheroidizing phase to form colored spherical polymer particles, whereby, while flow through the second microchannel, in the O/W or W/O relationship, the colored continuous phase is spherioidized and polymerized and cured to form colored spherical resin particles having a predetermined particle diameter.

Specifically, according to the present invention, the colored continuous phase of one or two or more hues as an O or W phase comprising an oily or aqueous fluid medium containing a polymerizable resin component and, dispersed in the medium, a color dye/pigment insoluble in the medium is transferred into the first microchannel. Next, the colored continuous phase is discharged into the spheroidizing phase of a W or O phase flowing through the second microchannel either continuously or intermittently. Subsequently, in the O/W or W/O relationship, the discharged colored continuous phase is successively deformed into spherical fine droplets during flow through the W or O phase within the second microchannel, and, at the same time or after some time period, the polymerizable resin component is polymerized and cured to form colored spherical polymer particles.

According to the present invention, when the colored continuous phase is of a single hue, the colored spherical particles thus produced have an average particle diameter of 1 to 400 μm on a volume basis and have a single color selected from achromatic colors of white and black, or chromatic colors such as red, blue, green, purple, and yellow.

Further, according to the present invention, when the colored continuous phase is of two hues, the colored spherical particles thus produced are two-color colored spherical polymer particles that have an average particle diameter of 1 to 400 μm on a volume basis and have two hues selected from achromatic colors of white and black, or chromatic colors such as red, blue, green, purple, and yellow.

According to the present invention, in the two-color colored spherical particles thus produced, since the two hues of the colored continuous phase are separated from each other, previous regulation to bipolarity in terms of electrification or magnetization is possible. Therefore, two-color colored spherical polymer particles of bipolarity in terms of electrification or magnetization can easily be formed.

According to the present invention, the colored spherical polymer particles which are monodispersive and have a single hue or two separated hues can be produced by the following apparatus for producing colored spherical polymer particles using microchannels. Specifically, according to the present invention, there is provided an apparatus for producing colored spherical polymer particles using microchannels, said apparatus being characterized by using a combination of a W phase microchannel with an O phase microchannel, that is, a first microchannel through which a colored continuous phase of an O or W phase is transferred and a second microchannel through which a fluid medium as a spheroidizing phase of a W or O phase flows, said colored continuous phase and said spheroidizing phase being in an O/W (oil-in-water) or W/O (water-in-oil) relationship with each other, said colored continuous phase being discharged from said first microchannel into said spheroidizing phase in the second microchannel to form colored spherical polymer particles having a predetermined particle diameter.

Specifically, in the first apparatus for producing colored spherical polymer particles using microchannels according to the present invention, a third microchannel and a fourth microchannel for supplying respective different colored fluid media for forming two phases as the colored continuous phase within said first microchannel are joined to said first microchannel on its liquid inflow end port side so that said third microchannel and said fourth microchannel are provided so as to cross each other at a predetermined angle. Further, the third microchannel and the fourth microchannel are provided so as to be coplanar with said first microchannel and said second microchannel. Further, this apparatus is characterized in that said first microchannel for transferring the oily or aqueous colored continuous phase and the second microchannel through which the aqueous or oily spheroidizing phase flows at a predetermined flow rate of F2 (ml/h) are cylindrical, and the liquid outflow end port of the cylindrical first microchannel is joined to the cylindrical second microchannel at an acute angle, a right angle or an obtuse angle as the crossing angle (or opening angle) in the direction of flow of said spheroidizing phase.

In the second apparatus for producing colored spherical polymer particles using microchannels according to the present invention, said first microchannel and said second microchannel are cylindrical, and the liquid outflow end port of the cylindrical first microchannel for transferring the oily or aqueous colored continuous phase is joined to the liquid inflow end port of the cylindrical second microchannel, through which the aqueous or oily spheroidizing phase flows, in the coaxial straight direction. A third microchannel and a fourth microchannel for supplying respective different colored fluid media for forming two phases as the colored continuous phase within said first microchannel are joined to said first microchannel on its liquid inflow end port side so that said third microchannel and said fourth microchannel are provided so as to cross each other at a predetermined angle and to be coplanar with said first microchannel and said second microchannel. Further, this apparatus is characterized in that a side microchannel for supplying the aqueous or oily spheroidizing phase into the second microchannel is provided on both sides on the same plane around said joining site between said first microchannel and said second microchannel so that said side microchannels cross each other in the direction of transfer of the colored continuous phase within said first microchannel at a crossing angle (or an opening angle) of an acute angle or a right angle.

In the production of colored spherical polymer particles by the production process of the present invention using the production apparatus with microchannel according to the present invention, when the widths of the microchannels are very small and are approximately several hundreds of micrometers, in the fluid which flows therethrough, the viscosity is a dominant parameter. Therefore, in this case, the Reynolds number is about not more than 1000, and the flow is likely to be laminar flow. Accordingly, when the fluid is allowed to flow into the first microchannel in the present invention, the fluid is likely to be transferred in a substantially laminar flow state. When the colored fluid to be transferred through this channel according to the present invention is, for example, a fluid which has two separated hues, the fluid can easily be transferred in a laminar flow state, that is, as a continuous phase in which two colors are not mixed together. Thus, when the colored continuous phase of an O or W phase transferred through the first microchannel is discharged into the second microchannel of a W or O phase, as is also apparent from the working examples of the present invention which will be described later, multicolored spherical resin particles of two or three colors separated clearly from each other are formed as colored spherical polymer particles having a narrow average particle diameter distribution (see FIG. 11).

BRIEF DESCRIPTION OF THE DRAWINGS

FIG. 3 are conceptual diagrams showing an embodiment of a system for colored continuous phase formation;

FIG. 6 are a conceptual perspective view and a plan view illustrating an embodiment of mass-production of colored spherical polymer particles by the production apparatus using microchannels according to the present invention;

FIG. 7 are conceptual plan views illustrating another embodiment of mass-production of colored spherical polymer particles by the production apparatus using microchannels according to the present invention;

FIG. 8 is a conceptual diagram showing another production apparatus using microchannels for mass production of colored spherical polymer particles according to the present invention;

FIGS. 11 (a) and 11 (b) are photographs showing the process of formation of two-color colored spherical polymer particles according to the present invention taken by a high-speed video camera.

DETAILED DESCRIPTION OF THE INVENTION

Figure 1:
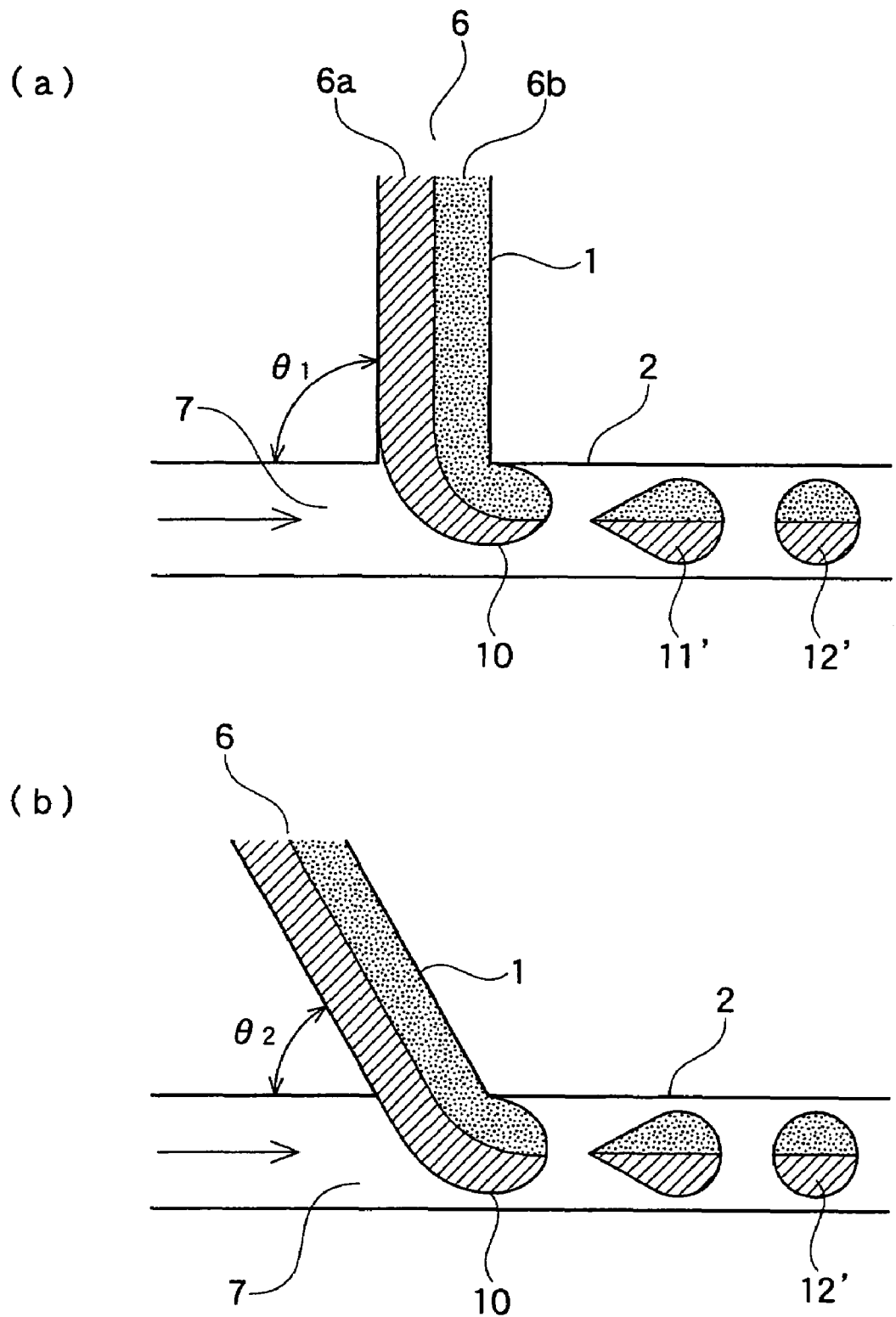
FIG. 1 are conceptual diagrams showing an embodiment of a first apparatus for producing colored spherical polymer particles using microchannels according to the present invention, in which the formation of colored spherical particles is illustrated.

Embodiments of the production process of colored spherical particles, colored spherical particles produced by the production process, and the apparatus for production of colored spherical particles using microchannels according to the present invention will be described in more detail.

As already described above, the production process of colored spherical particles according to the present invention utilizes microchannels including, for example, a first microchannel through which a colored continuous phase of an O phase is transferred and a second microchannel through which a spheroidizing phase of a W phase flows at a predetermined flow rate of F2 (ml/h), said colored continuous phase and said spheroidizing phase being in an O/W (oil-in-water) or W/O (water-in-oil) relationship with each other, and, when the colored continuous phase is discharged from the first microchannel into and mixed and dispersed in the second microchannel, the colored continuous phase is brought to colored spherical polymer particles while flowing through the second microchannel.

In the present invention, the colored continuous phase of an O phase comprising a fluid medium containing a polymerizable resin component and, dispersed in the medium, a color dye or pigment insoluble in the medium is likely to be transferred in a laminar flow state, because the Reynolds number in this channel is not more than 1000. In particular, the present invention is characterized in that the colored continuous phase of two hues clearly different from each other is transferred through the first microchannel as a continuous phase under laminar flow.

Accordingly, in the present invention, the colored continuous phase as the O or W phase can be properly transferred through the first microchannel or discharged into the second microchannel at a flow rate F1 of 0.01 to 10 (ml/h), preferably 0.01 to 5 (ml/h), although the flow rate varies depending upon the viscosity, surface tension, density, liquid properties (polar group) of medium and the like of the colored fluid medium to be transferred. The spheroidizing phase can be allowed to flow through the second microchannel at a predetermined flow rate F2 (ml/h) which is a flow rate suitable for the discharged colored continuous phase to be properly spheroidized while flowing through the second microchannel, specifically at a flow rate F2 of 1 to 100 (ml/h), preferably 1 to 50 (ml/h).

In the present invention, as is also apparent from facts indicated in the working examples described later, for example, the amount of colored spherical polymer particles produced, the average particle diameter of the colored polymer particles, and the monodispersibility of the particles relate to the transfer or discharge flow rate F1 of the colored continuous phase and the flow rate F2 of the spheroidizing phase. Accordingly, in a relationship with liquid properties such as viscosity, density and surface tension of fluids constituting both the phases, preferably, the flow ratio, F2/F1, can be properly specified.

The colored continuous phase discharged into the second microchannel should be spheroidized during discharge, dispersion and transfer, and the polymerizable resin component in the discharged colored continuous phase should be properly polymerized and cured. In the present invention, the shape of spheres of the discharged colored continuous phase after the spheroidization is stable. Therefore, the polymerizable resin component is not always required to be fully polymerized and cured during flow through the second microchannel, and the polymerization and curing may be properly carried out under UV irradiation and/or heating in a separate container as a recovery tank for colored spherical particles provided outside the second microchannel system.

Accordingly, in the present invention, colorants constituting two separated hues as two separated phases in the colored continuous phase may be two colors of achromatic colors of white and black, or two colors selected from chromatic colors such as red, blue, green, purple, and yellow. Dyes or pigments for constituting the above hues may be properly selected without particular limitation so far as they are insoluble or can be homogeneously dispersed in a fluid dispersion medium containing a polymerizable resin component, which will be described later, suitable for use in the present invention. In the present invention, preferably, any oil-soluble dye of which the solubility in water is lower than the solubility in the monomer may be suitably used. Oil soluble dyes include, for example, black oil soluble dyes such as Olesolol Fast Black, BONJET BLACK CW-1, Solvent Black 27Cr(III) (content 5%), and Pigment Black 7/water; red oil soluble dyes such as VALIFAST RED 3306, Olesolol Fast RED BL, Solvent RED 8Cr(III) (content 5.8%); blue oil soluble dyes such as Kayaset Blue and Solvent Blue 35; yellow oil soluble dyes such as VALIFAST YELLOW 4120, Oil Yellow 129, Solvent Yellow 16, Solvent Yellow 33, and Disperse Yellow 54; lemon oil soluble dyes such as Piast Yellow 8005; green oil soluble dyes such as Oil Green 502, Opias Green 502, and Solvent Green 3; magenta oil soluble dyes such as VALIFAST PINK 2310N, Plast RED D-54, Plast RED 8355, Plast RED 8360, Plast Violet 8850, Disperse Violet 28, Solvent RED 149, Solvent RED 49, Solvent RED 52, and Solvent RED 218Cr(III) (content 4%); cyan oil soluble dyes such as VALIFAST BLUE 2610, VALIFAST BLUE 2606, Oil BLUE 650, Plast BLUE 8580, Plast BLUE 8540, Oil BLUE 5511, and Solvent Blue 70Cu (content 4%); orange oil soluble dyes such as Oil Orange 201, VALIFAST ORANGE 3210, Solvent Orange 70, and Kayaset Orange G; and brown oil soluble dyes such as VALIFAST BROWN 2402, Solvent Yellow 116, and Kayaset Flavine FG. Additional examples thereof include Solvent Blue, Solvent Red, Solvent Orange, Solvent Green, and Lumogen F Orange. Further examples thereof include: dyes commonly used in recording liquids for writing, such as coumarin, perylene, dicyanovinyl, azo, quinophthalone, aminopyrazole, methine, dicyanoimidazole, indoaniline, and phthalocyanine dyes; leuco dyes used as thermal recording paper and temperature-sensitive colorants; and tar dyes used in cosmetics, for example, Rhodamine B Stearate (Red No. 215), Tetrachlorotetrabromofluorescein (Red No. 218), Tetrabromofluorescein (Red No. 223), Sudan III (Red No. 225), Dibromofluorescein (Orange No. 201), Diiodofluorescein (Orange No. 206), Fluorescein (Yellow No. 201), Quinoline Yellow SS (Yellow No. 204), Quinizarine Green SS (Green No. 202), Alizurine Purple SS (Violet No. 201), Scarlet Red N.F. (Red No. 501), Oil Red XO (Red No. 505), Orange SS (Orange No. 403), Yellow AB (Yellow No. 404), Yellow OB (Yellow No. 405), and Sudan Blue B (Blue No. 403).

Further, in the present invention, these dyes may be used solely or as a mixture of two or more of them. If necessary, various direct dyes, acid dyes, basic dyes, azoic dyes, reactive dyes, fluorescent dyes, and brightening agents may also be used, and, further, dispersion in monomers such as (meth)acrylic monomers (A) is possible. Various inorganic and organic pigments, for example, yellow pigments such as Permanent Yellow DHG, Lionol Yellow 1212B, Symuler Fast Yellow 4400, and Pigment Yellow 12; magenta pigments such as Pigment Red 57:1, Lionol Red 6B-4290G, Irgalite Rubine 4BL, and Fastogen Super Magenta RH; cyan pigments such as Lionol Blue 7027, Fastogen Blue BB, and Cromophtal Blue 4GNP; black pigments such as Carbon Black and Black Pearls 430; titanium white, iron oxide red, and ultramarine blue may also be used. Further, these dyes and pigments (or dye/pigment) may be properly selected depending upon the type of a polymerizable resin component (a monomer which will be described later) for constituting the aqueous or oily fluid colored continuous phase and the dispersibility in the colored continuous phase, and applications of the resultant colored particles, that is, use in electrophotographic image devices such as copying machines, facsimiles and laser printers, particularly desired color tones or the like in image displays and/or print displays, for example, in PLDs and other color display devices using two-color particles according to the present invention.

The amount of the dye/pigment as the colorant added is not particularly limited. Further, since desired color tone is also different, for example, according to applications of the colored particles and from the viewpoint of dispersibility or the like in the colored continuous phase, in the present invention, the amount of the dye/pigment added may be properly selected in the range of 0.1 to 10 parts by weight, preferably 2 to 8 parts by weight, based on 100 parts by weight of the whole polymerizable resin component as the polymerizable and curable component in the colored continuous phase.

Further, in the present invention, preferably, regarding the polymerizable resin component in the colored continuous phase in the form of two separated color phases, the polymerizable resin component constituting one color phase and the polymerizable resin component constituting the other color phase may be different from each other in that one of the polymerizable resin component is positively electrified while the other polymerizable resin component is negatively electrified. When the spherical polymer particles having two hues thus obtained are used as colored spherical particles for displays, for example, in electrophoretic display cells such as PLDs, resin components in which the two hues are positively and negatively electrified may be properly selected.

Accordingly, based on this standpoint, regarding the polymerizable resin component (or polymerizable monomer) used in the present invention, as is apparent from various monomer species recited as specific examples of polymerizable monomers, according to the type of the functional group or substituent in the polymerizable monomer used in the present invention, monomer species which are likely to exhibit (−) electrification and (+) electrification may be mentioned as monomers usable in the present invention. Accordingly, when at least two, that is, a plurality of monomers are used as the polymerizable resin component in the present invention, while fully taking into consideration whether the monomers are likely to exhibit (+) or (−) electrification, preferably, a combination of a plurality of monomers which are likely to exhibit the same type of electrification may be suitably used.

On the other hand, in the polymerizable resin component (or polymerizable monomer) having in its molecule at least one functional group and/or substituent, examples of the functional group or substituent include carbonyl, vinyl, phenyl, amino, amide, imide, hydroxyl, halogen, sulfonic acid, and epoxy groups and a urethane bond. In the present invention, the above monomer species having at least one functional group or substituent in the polymerizable monomers may be suitably used solely or in a combination of at least two, that is, a plurality of types.

Polymerizable monomers which are likely to exhibit (−) electrification include, for example, aryl (meth)acrylates, such as phenyl (meth)acrylate and benzyl (meth)acrylate; halogen-containing polymerizable monomers, such as 2-chloroethyl (meth)acrylate; nitrile-containing polymerizable monomers, such as acrylonitrile and methacrylonitrile; epoxy-containing polymerizable compounds, for example, glycidyl (meth)acrylate, mono- and alkyl-glycidyl esters of dicarboxylic acid such as mono- and di-glycidyl esters of maleic acid, mono- and di-glycidyl esters of fumaric acid, mono- and di-glycidyl esters of crotonic acid, mono- and di-glycidyl esters of tetrahydrophthalic acid, mono- and di-glycidyl esters of itaconic acid, mono- and di-glycidyl esters of butene tricarboxylic acid, mono- and di-glycidyl esters of citraconic acid, and mono- and di-glycidyl esters of allyl succinic acid, and alkylglycidyl esters of p-styrenecarboxylic acid; hydroxy-containing polymerizable compounds, such as 2-hydroxyethyl (meth)acrylate, 2-hydroxypropyl (meth)acrylate, monoesters of (meth)acrylic acid and polypropylene glycol or polyethylene glycol, and adducts of lactones and 2-hydroxyethyl (meth)acrylate; fluorine-containing vinyl monomers, for example, fluorine-substituted (meth)acrylic acid alkyl esters, such as trifluorodimethyl (meth) acrylate, 2-trifluoromethylethyl (meth) acrylate, 2-perfluoromethylethyl (meth)acrylate, 2-perfluoroethyl-2-perfluorobutylethyl (meth)acrylate, 2-perfluoroethyl (meth)acrylate, perfluoromethyl (meth) acrylate, and diperfluoromethylmethyl (meth)acrylate; unsaturated carboxylic acids, such as acrylic acid, methacrylic acid, tetrahydrophthalic acid, itaconic acid, citraconic acid, crotonic acid, maleic acid, fumaric acid, isocrotonic acid, norbornenedicarboxylic acid, and bicyclo[2,2,1] hept-2-ene-5,6-dicarboxylic acid; derivatives thereof, for example, maleic anhydride, itaconic anhydride, citraconic anhydride, tetrahydrophthalic anhydride, bicyclo[2,2,1] hept-2-ene-5,6-dicarboxylic anhydride, and acid halide; and organosilicon-containing (meth)acrylic monomers, such as γ-methacryloxypropyltrimethoxysilane.

(Poly)alkylene glycol diacrylates include, for example, ethylene glycol diacrylate, diethylene glycol diacrylate, triethylene glycol diacrylate, polyethylene glycol diacrylate, dipropylene glycol diacrylate, and tripropylene glycol diacrylate, and (poly)alkylene glycol dimethacrylates include, for example, ethylene glycol dimethacrylate, diethylene glycol dimethacrylate, triethylene glycol dimethacrylate, polyethylene glycol dimethacrylate, propylene glycol dimethacrylate, dipropylene glycol dimethacrylate, and tripropylene glycol dimethacrylate.

Examples of styrene monomers include, alkyl styrenes, for example, styrene, methylstyrene, dimethylstyrene, trimethylstyrene, ethylstyrene, diethylstyrene, triethylstyrene, propylstyrene, butylstyrene, hexylstyrene, heptylstyrene, and octylstyrene, halogenated styrenes, for example, fluorostyrene, chlorostyrene, bromostyrene, dibromostyrene, and chloromethylstyrene, and other styrene monomers, for example, nitrostyrene, acetylstyrene, methoxystyrene, α-methylstyrene, vinyltoluene, and sodium p-styrenesulfonate.

Functional group-free (meth)acrylic monomers include, for example, alkyl acrylates such as methyl (meth)acrylate, ethyl (meth)acrylate, butyl (meth)acrylate, and octyl (meth) acrylate, cycloalkyl (meth)acrylates such as cyclohexyl (meth)acrylate, and esters of (meth)acrylic acid with bicyclic alcohols, such as isobornyl acrylate. Vinyl-containing monomers include, for example, fluorine-containing vinyl monomers, such as perfluoroethylene, perfluoropropylene, and vinylidene fluoride, silicon-containing vinyl monomers, such as vinyltrimethoxysilane and vinyltriethoxysilane, vinyl esters, such as vinyl acetate, vinyl propionate, vinyl n-butylate, vinyl isobutylate, vinyl pivalate, vinyl caproate, vinyl versatate, vinyl laurylate, vinyl stearate, vinyl benzoate, vinyl p-t-butylbenzoate, and vinyl salicylate, and other vinyl-containing monomers, such as vinylidene chloride, vinyl chlorohexanecarboxylate, and β-methacryloyloxyethyl hydrogenphthalate.

On the other hand, polymerizable monomers which are likely to exhibit (+) electrification include, for example, amido-containing vinyl monomers, such as methacrylamide, N-methylolmethacrylamide, N-methoxyethylmethacrylamide, and N-butoxymethylmethacrylamide; and amino-containing ethylenically unsaturated compounds, for example, alkyl ester derivatives of acrylic acid or methacrylic acid, such as aminoethyl (meth)acrylate, propylaminoethyl (meth)acrylate, dimethylaminoethyl methacrylate, aminopropyl (meth)acrylate, phenylaminoethyl methacrylate, and cyclohexylaminoethyl methacrylate, vinylamine derivatives, such as N-vinyldiethylamine and N-acetylvinylamine, allylamine derivatives, such as allylamine, methacrylamine, N-methylacrylamine, N,N-dimethylacrylamide, and N,N-dimethylaminopropylacrylamide, acrylamide derivatives, such as acrylamide and N-methylacrylamide, aminostyrenes, such as p-aminostyrene, (meth)acrylamides, such as N-methylol(meth)acrylamide and diacetone acrylamide, 6-aminohexylsuccinimide, and 2-aminoethylsuccinimide.

Further suitable monomers usable herein include, for example, monomers having an amino-containing ethylenically unsaturated bond, for example, alkyl ester derivatives of acrylic acid or methacrylic acid, such as aminoethyl (meth) acrylate, propylaminoethyl (meth) acrylate, dimethylaminoethyl methacrylate, aminopropyl (meth) acrylate, phenylaminoethyl methacrylate, and cyclohexylaminoethyl methacrylate, vinylamine derivatives, such as N-vinyldiethylamine and N-acetylvinylamine, allylamine derivatives, such as allylamine, methacrylamine, N-methylacrylamine, N,N-dimethylacrylamide, and N,N-dimethylaminopropylacrylamide, acrylamide derivatives, such as acrylamide and N-methylacrylamide, aminostyrenes such as N-aminostyrene, 6-aminohexylsuccinimide, and 2-aminoethylsuccinimide.

In the present invention, when the polymerizable monomer polymerized as the polymerizable resin component after discharge as the colored continuous phase into the second microchannel is used in combination with other comonomer, the use of other comonomer in such an amount that the proportion of the electrifiable monomer in the whole monomer is preferably in the range of 1 to 100% by weight, more preferably 5 to 100% by weight, particularly preferably 10 to 100% by weight, can suitably provide electrifiable colored resin fine particles which can exhibit desired type of electrification and electrophoretic properties, although the amount varies depending upon desired type of electrification (or electrophoretic property) of the colored resin fine particles.

Further, in order that electrifiable colored resin fine particles according to the present invention, for example, when used as electrostatic color toners having desired electrification properties in an electric field of an electrophotographic image device, or used in PLDs, can exhibit desired type of electrification and electrophoretic properties, the shape of particles is also important. As described above, the colored particles produced by the production process according to the present invention are spherical and have excellent monodispersibility and thus are substantially spherical colored resin particles in which the surface of the particles can be evenly electrified. The average particle diameter can be properly regulated in the range of 1.0 to 400 µm, preferably 1.0 to 200 µm, more preferably 1.0 to 50 µm, on a volume basis. Further, uniform particles having a significantly small variation in average particle diameter can be properly prepared. In the present invention, monodisperse electrifiable colored resin fine particles possessing excellent electrification and electrophoretic properties can be provided which have a uniformity ratio of not more than 20%, preferably not more than 5%, more preferably not more than 3%, in terms of Cv value.

For the electrifiable colored resin fine particles according to the present invention having the high uniformity ratio which are electrifiable and electrophoretic, the surface electrification amount C (µC/g) expressed in terms of |C| as measured, for example, by the blow-off method is preferably in the range of $0.1 \leq |C| \leq 500$, more preferably $0.5 \leq |C| \leq 200$, particularly preferably $1 \leq |C| < 100$, depending upon the polymerizable monomer species and a combination of the polymerizable monomer species.

Further, in the present invention, in the colored continuous phase of two hues as two separated phases, one phase in the two phases may be positively magnetized while negatively magnetizing the other phase or vice versa. The use of a polymerizable resin component with a conventional magnetic powder dispersed therein can provide monodisperse colored spherical particles in which the spherical polymerizable particles having two hues can be magnetized in two types of polarity, that is, positively and negatively magnetized.

Further, in the present invention, other additive components usable in forming the colored continuous phase include, for example, polymerization initiators, for example, persulfates such as potassium persulfate and ammonium persulfate, peroxides such as benzoyl peroxide and lauroyl peroxide, and azo compounds such as azobisisobutyronitrile. Polymerization initiators preferably usable in coloring and polymerization include, for example, azo polymerization initiators, such as 2,2'-azobis (2-methylpropionitrile), 2,2'-azobis(2-methylbutyronitrile), 2,2'-azobis(2,4-dimethylvaleronitrile), 2,2'-azobis(2-cyclopropylpropionitrile), 1,1'-azobis(cyclohexane-1-carbonitrile), and dimethyl-2,2'-azobis (2-methylpropionate) In general, the amount of the polymerization initiators is suitably 0.01 to 5 parts by weight, preferably 0.5 to 2 parts by weight, based on 100 parts by weight of the polymerizable monomer.

In the present invention, in the second microchannel, since the colored continuous phase is brought to spheroidized colored particles, the resin component can be properly polymerized and cured under UV irradiation. Therefore, in the present invention, a photopolymerization initiator can be used. Photopolymerization initiators usable herein include conventional photopolymerization initiators, for example, acetophenones, for example, acetophenone, 2,2-diethoxyacetophenone, p-dimethylaminoacetophenone, methoxyacetophenone, 2,2-dimethoxy-2-phenylacetophenone, and 2-hydroxy-2-cyclohexylacetophenone; ketones, for example, benzophenone, 2-chlorobenzophenone, p,p'-dichlorobenzophenone, p,p'-bisdiethylaminobenzophenone, N,N'-tetramethyl-4,4'-diaminobenzophenone (Michler's ketone), and 4-(2-hydroxyethoxy)phenyl (2-hydroxy-2-propyl) ketone; benzoin ethers, for example, benzoin, benzoin methyl ether, benzoin ethyl ether, benzoin isopropyl ether, benzoin isobutyl ether, benzyl methyl ketal, and benzoyl benzoate; α-acyloxime esters; and thioxanthones. If necessary, for example, n-butylamine, triethylamine, and tri-n-butylphosphine may be added as UV sensitizers.

Furthermore, in the present invention, the resin component can be properly polymerized and cured under heating. Heat-decomposable polymerization initiators are also usable, and examples thereof include organic peroxides, organic hydroperoxides, organic peroxyketals, and azo compounds. Organic peroxides include, for example, dicumyl peroxide, di-tert-butyl peroxide, tert-butylcumyl peroxide, dilauroyl peroxide, dibenzoyl peroxide, diacetyl peroxide, didecanoyl peroxide, diisononayl peroxide, and 2-methylpentanoyl peroxide. Organic hydroperoxides include, for example, tert-butyl hydroperoxide, cumyl hydroperoxide, 2,5-dimethyl-2,5-dihydroperoxyhexane, p-methane hydroperoxide, and diisopropylbenzene hydroperoxide. Organic peroxyketals include, for example, 1,1-bis(tert-hexylperoxy)-3,3,5-trimethylcyclohexane, 1,1-bis (tert-hexylperoxy) cyclohexane, and 1,1-bis(tert-butylperoxy)3,3,5-trimethylcyclohexane. Azo compounds include, for example, 2,2'-azobisisobutylonitrile, 2,2'-azobis-2,4-dimethylvaleronitrile, 2,2'-azobiscyclohexylnitrile, 1,1'-azobis(cyclohexane-1-carbonitrile), 2-phenylazo-4-methoxy-2,4-dimethylvaleronitrile, and dimethyl-2,2'-azobisisobutylate. These polymerization initiators may be used alone. In general, however, they may be used in a combination of two or more of them.

Furthermore, in the present invention, the use of a component for forming a crosslinked structure is not always necessary for the formation of the colored continuous phase. If necessary, however, in order to introduce a crosslinked structure, for example, a bifunctional or higher polyfunctional monomer can be suitably used. Polyfunctional monomers include, for example, ethylene glycol di(meth)acrylate, triethylene glycol di(meth)acrylate, tetraethylene glycol di(meth)acrylate, diethylene glycol di(meth)acrylate, polypropylene glycol di(meth)acrylate, neopentyl glycol di(meth)acrylate, trimethylolpropane tri(meth)acrylate, pentaerythritol tri(meth)acrylate, 1,1,1-trishydroxymethylethane diacrylate, 1,1,1-trishydroxymethylethane triacrylate, 1,1,1-trishydroxymethylpropane triacrylate, and N-methylol acrylamide. In general, the polyfunctional monomer may be suitably used in an amount of 0.5 to 50 parts by weight, preferably 1 to 15 parts by weight, based on 100 parts by weight of the polymerizable monomer.

If necessary, other additives (formulating agents) known per se, for example, heat stabilizers, conductive agents, dispersants, preservatives, surface tension adjusting agents, antifoaming agents, rust preventives, antioxidants, near-infrared ray absorbents, ultraviolet absorbers, fluorescent agents, and fluorescent brightening agents, may be added to and dispersed in the colored continuous phase of O phase in the present invention according to formulations known per se.

Embodiments of the production process of colored spherical particles using microchannels according to the present invention and the production apparatus using microchannels according to the present invention used in the production of the colored spherical particles will be described with reference to FIGS. 1 to 5 (conceptual diagrams of the production apparatus using microchannels according to the present invention).

Figure 2:
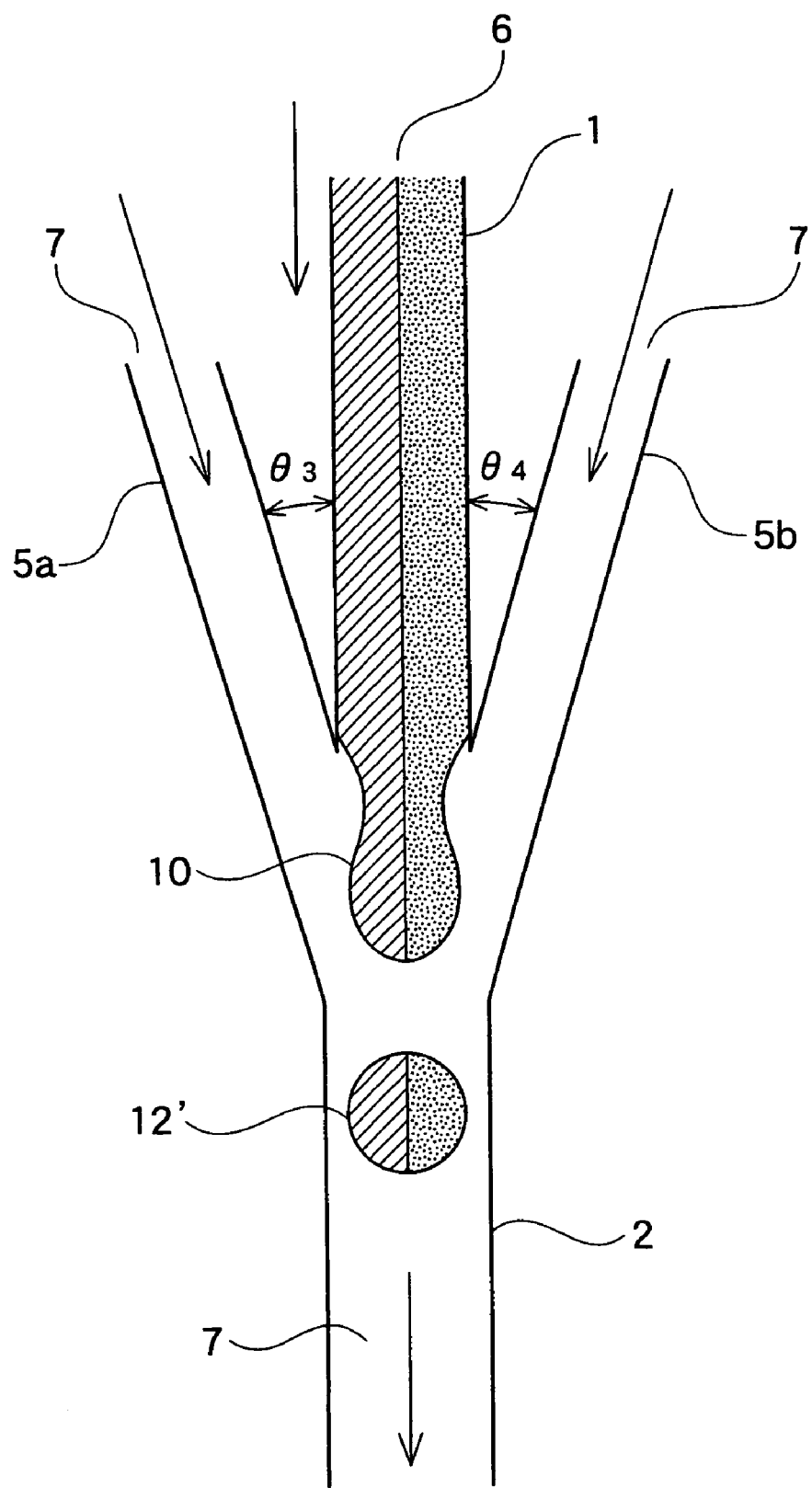
FIG. 2 is a conceptual diagram showing an embodiment of a second apparatus for producing colored spherical polymer particles using microchannels according to the present invention, in which the formation of colored spherical particles is illustrated.
Figure 4:
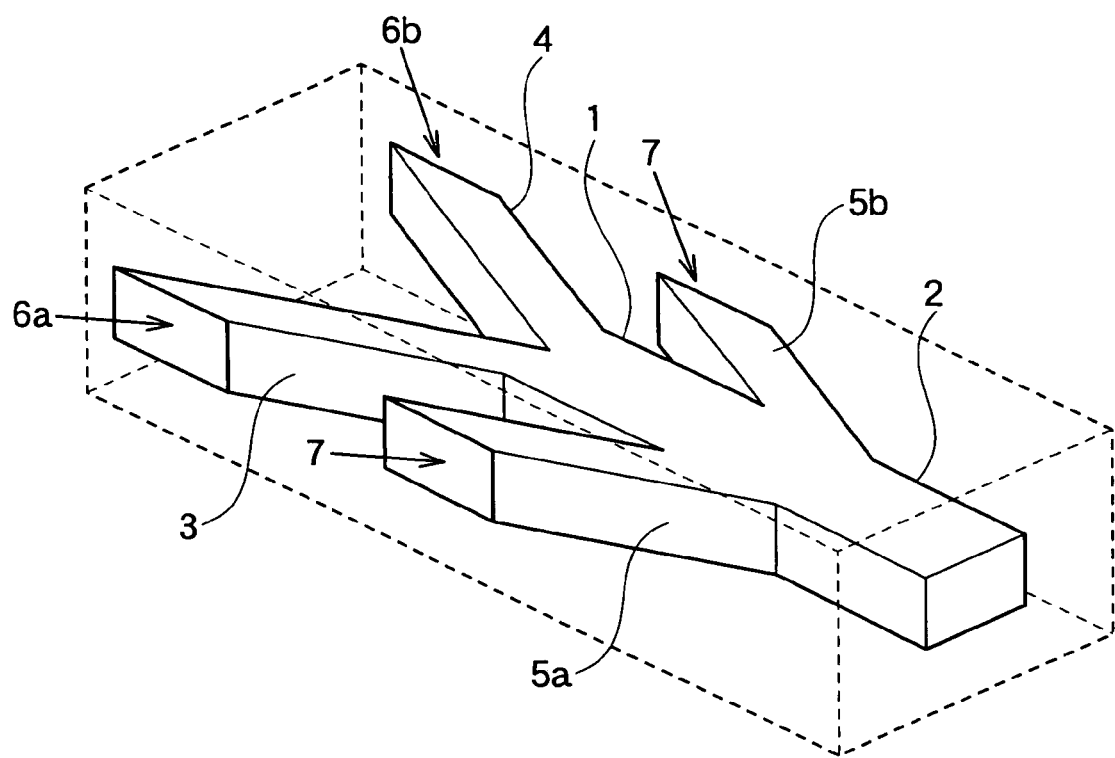
FIG. 4 is a conceptual perspective diagram showing a representative embodiment of the apparatus for producing colored spherical polymer particles using microchannels according to the present invention.

The colored spherical polymer particles according to the present invention are suitably produced, for example, using the first microchannel-type production apparatus according to the present invention shown in FIG. 1 and the second microchannel-type production apparatus according to the present invention shown in FIGS. 2 and 4. In the production of the colored spherical polymer particles, a colored continuous phase of one hue or at least two hues, transferred through the first microchannel, comprising an oily (O phase) or aqueous (W phase) fluid medium containing a polymerizable resin component and, dispersed in the fluid medium, a color dye/pigment insoluble in the fluid medium is discharged into an aqueous (W phase) or oily (O phase) spheroidizing phase flowing through the second microchannel either continuously or intermittently. The discharged colored continuous phase and the spheroidizing phase are in an O/W or W/O relationship with each other, and, in this relationship, the discharged colored continuous phase is brought to monodisperse colored spherical polymer particles while flowing through the spheroidizing phase.

Accordingly, in the first microchannel-type production apparatus according to the present invention, as shown in FIGS. 1 (a) and 1 (b), the liquid outflow end port in a first microchannel 1 can be joined (or connected) to a second microchannel 2 at an obtuse angle, i.e., a crossing angle $\theta \leq 90°$ or $90°<\theta \leq 160°$, in the direction of flow of the spheroidizing phase. An embodiment in which the crossing angle in this joining is $\theta 1=90°$ is shown in FIG. 1 (a). An embodiment in which the crossing angle in this joining is acute, that is, $0°<\theta 2<90°$, is shown in FIG. 1 (b). As is apparent from both the embodiments, a colored continuous phase 6 of two hues [6a/6b] is transferred through the first microchannel 1 and is discharged into the cylindrical second microchannel 2 through which the spheroidizing phase 7 flows at a predetermined flow rate. In this stream, the discharged colored continuous phase 6 is spheroidized while being allowed to flow as indicated in "10"→"11"'→"12"'. In the embodiments of the present invention, the first microchannel and the second microchannel can be connected to each other at a crossing angle θ properly selected in the range of $0°<\theta<90°$. Alternatively, the crossing angle θ may be suitably an obtuse angle, i.e., $90°<\theta \leq 160°$ (not shown).

In the second microchannel-type production apparatus, as shown in FIG. 2, the liquid outflow end port in the first microchannel 1 is joined to the liquid inflow end port in the cylindrical second microchannel 2 through which the spheroidizing phase 7 flows at a predetermined flow rate F (ml/h), in the coaxial straight direction. Both side microchannels 5a and 5b are joined to the second microchannel 2 on both sides on the same plane around the joining site between the first microchannel and the second microchannel respectively at a crossing angle $\theta 3=45\pm 5$ to $40°$ and a crossing angle $\theta 4=45\pm 5$ to $40°$ in the direction of transfer of the colored continuous phase 6 within the first microchannel. As is apparent from FIG. 2, at the joining site (or connection site), the colored continuous phase 6 of two hues [6a/6b] transferred through the first microchannel 1 is discharged into the second microchannel 2 so as to be picked away, as a discharged phase 10 of the colored continuous phase 6 in the front end port (liquid outflow end port) in the first microchannel 1, by the spheroidizing phase 7 supplied from both side microchannels 5a and 5b, whereby a spheroidized product 12 of the colored continuous phase 6 is formed. In the present invention, preferably, the crossing angles θ3 and θ4 may be suitably acute angle so as to satisfy a relationship of $\theta 3=\theta 4$ and θ3 and $\theta 4=45\pm 5$ to $40°$. Alternatively, the crossing angles θ3 and θ4 may be suitably right angle or an obtuse angle of not less than 90° (not shown).

In the present invention, in the first and second microchannel-type production apparatuses, in order to transfer the colored continuous phase 6 of two hues [6a/6b] into the first microchannel 1, for example, in a system shown in FIG. 3 (a), the two hues [6a/6b] are supplied to the liquid inflow end port of the first microchannel. As shown in FIG. 3 (a), the third microchannel 3 and the fourth microchannel 4 are joined in a V form to the liquid inflow end port in the first microchannel 1. Different hues 6a and 6b are supplied from the third and fourth microchannels to the first microchannel 1 to form the colored continuous phase 6 of two hues [6a/6b] within the first microchannel 1. In the system shown in FIG.

3 (a), the third microchannel 3 and the fourth microchannel 4 constituting the V form are preferably provided so as to be coplanar with the first microchannel 1. The crossing angle θ5 at which the V form is formed at the joining site is suitably 90±80°, preferably θ5=90±60°.

Further, in the present invention, if necessary, microchannels 3 and 4 for supplying the colored continuous phase may be provided in a system as shown in FIG. 3 (b). In the system shown in FIG. 3 (b), for example, the third microchannel 8 is joined to the intermediate site of the first microchannel 1 through which the hue 6b is transferred at an acute crossing angle θ6 (or opening angle) in the direction of transfer of the hue 6b, and the hue 6a is supplied from the third microchannel 8, whereby a colored continuous phase 6 of two hues [6a/6b] can be suitably formed and transferred within the first microchannel 1.

Further, in the present invention, the shape of a vertically cut port of the first to fifth microchannels and the side microchannels may be, for example, circular, elliptical and quadrilateral (square, rectangular, or trapezial). Microchannels in which the shape of the vertically cut port is preferably quadrilateral (square or rectangular) can be properly selected from the viewpoint of microfabrication of microchannels having such a shape in a material such as a glass plate or a plastic plate. In the present invention, for example, in the microchannels in which the cut port is rectangular, the size may be suitably such that the long side of the cut port is in the range of 0.5 to 500 µm and the short side of the cut port is in the range of 0.5 to 500 µm. The lower limit of the long side and the lower limit of the short side each are preferably 1 µm.

A representative embodiment of the microchannel-type apparatus for producing colored spherical polymer particles according to the present invention is shown in FIG. 4 (conceptual perspective view). In FIG. 4, a single-color colored continuous phase 6a and a single-color colored continuous phase 6b different from the single-color colored continuous phase 6a are supplied respectively to a third microchannel 3 and a fourth microchannel 4 and are then transferred into a first microchannel 1 to form a colored continuous phase 6 of two hues. Subsequently, the colored continuous phase [6a/6b] is successively discharged into a spheroidizing phase 7 which flows through a second microchannel 2. The spheroidizing phase 7 is supplied from side microchannels 5a and 5b provided on both sides of the end of the first microchannel 1.

Figure 5:
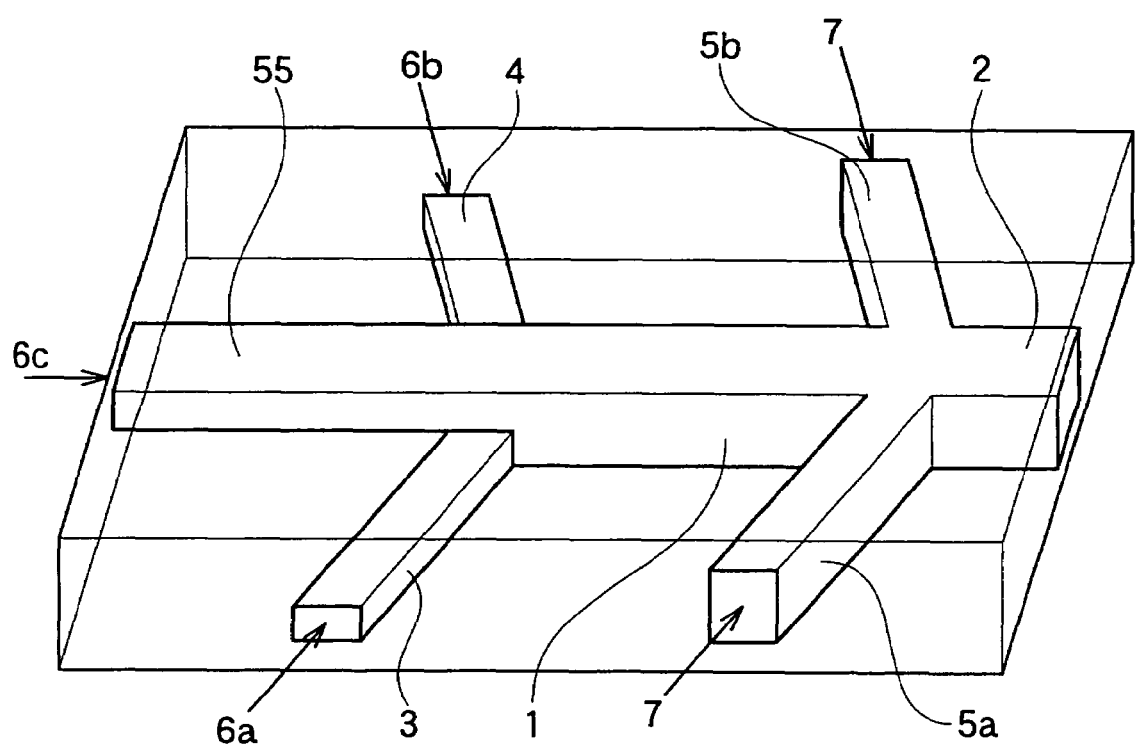
FIG. 5 is a conceptual perspective diagram showing a representative embodiment of the apparatus for producing colored spherical polymer particles of three hues using microchannels according to the present invention.

A representative embodiment of the microchannel-type apparatus for producing colored spherical polymer particles according to the present invention in which the colored continuous phase 6 transferred into the first microchannel 1 is of three hues is shown in FIG. 5 (conceptual perspective view). In FIG. 5, single-color colored continuous phases 6a and 6b different from each other are supplied respectively to a third microchannel 3 and a fourth microchannel 4. Further, a different single-color colored continuous phase 6c is supplied from the fifth microchannel 55, whereby a colored continuous phase 6 of three hues is formed and transferred into a first microchannel 1. The colored continuous phase 6 [6a/6b/6c] is then successively discharged into a spheroidizing phase 7 which flows through a second microchannel 2, whereby colored spherical particles of three hues are formed. The spheroidizing phase 7 is supplied from side microchannels 5a and 5b provided on both sides of the liquid outflow end port in the first microchannel 1 into the second microchannel 2.

In connection with the above-described microchannel-type apparatus for producing colored spherical polymer particles according to the present invention, representative embodiments of the microchannel-type apparatus for mass-producing colored spherical polymer particles according to the present invention are shown in FIGS. 6 to 9 (conceptual perspective view and plan view).

As shown in FIGS. 6 (a) and 6 (b), on the same plane, four channels (11 to 14) as the first microchannels 1 are joined respectively to four channels (21 to 24) as the second microchannels 2 in the coaxial straight direction. The liquid outflow end ports as one end in the second microchannel 2 is provided so as to open to the side face of a recovery tank 30 for colored spherical particles. The opening sites function as a plurality of discharge ports, for colored spherical particles, which are preferably provided at equal intervals on the same plane in the direction of the central axis of the recovery tank 30. Further, as is apparent from FIGS. 6 (a) and 6 (b), a third microchannel 3 and a fourth microchannel 4 for supplying respective different two-color colored continuous phases 6a and 6b are provided at the liquid inflow end ports as one end of the plurality of first microchannels 1. Side microchannels 5a and 5b are provided for supplying a spheroidizing phase 7 from both sides of the joining site between the first microchannel 1 and the second microchannel 2. Thus, four discharge ports for discharging colored spherical particles into the recovery tank 30 are provided in the microchannel-type apparatus for mass production of colored spherical particles shown in FIG. 6. Further, in the present invention, the microchannel-type apparatus for mass production of colored spherical particles in which three to twelve discharge ports are provided may be suitably provided. For example, FIGS. 7 (a) and 7 (b) show an embodiment of the microchannel-type apparatus for mass production of colored spherical particles in which twelve discharge ports are provided.

Figure 9:
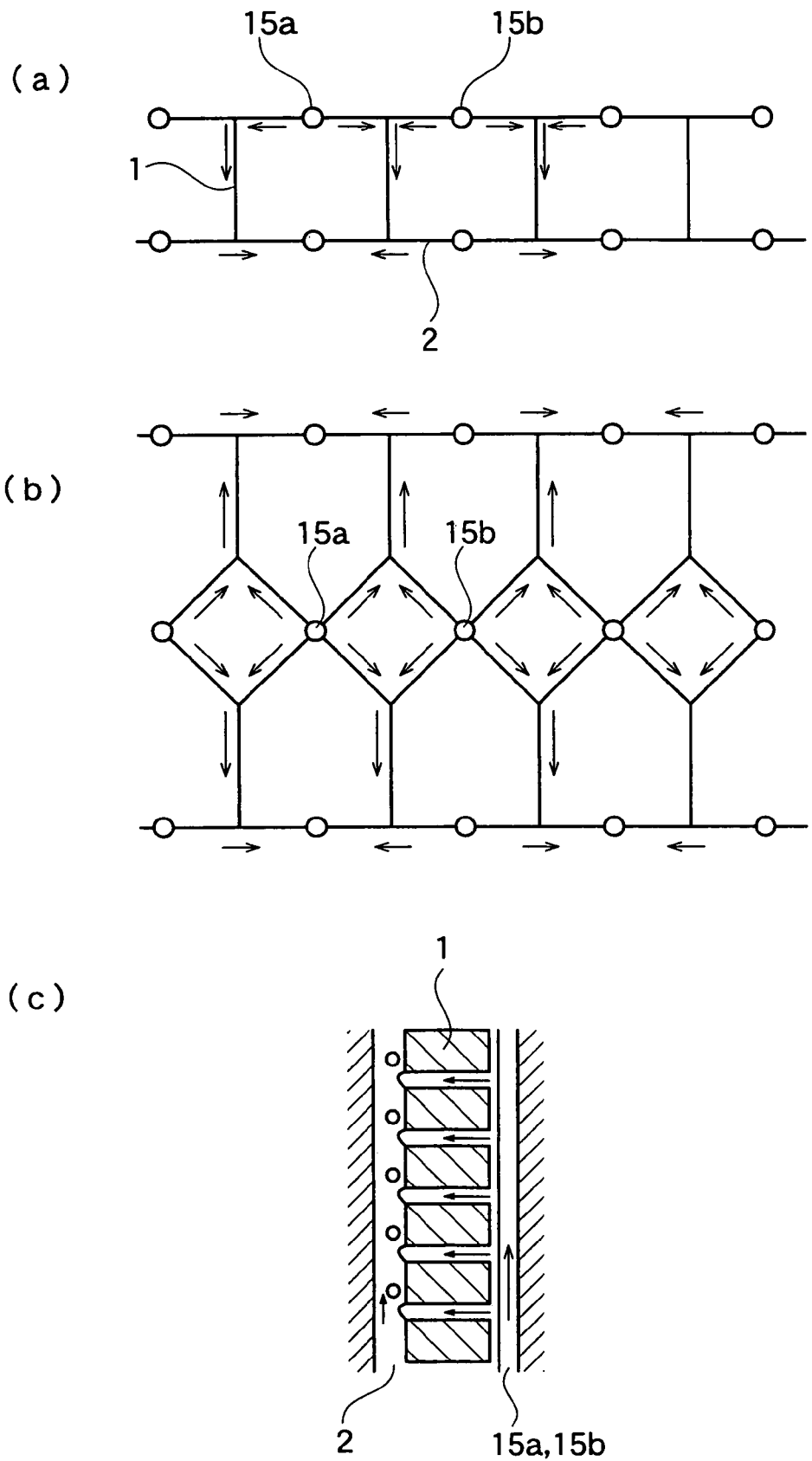
FIG. 9 are conceptual diagrams showing further production apparatuses using microchannels for mass production of colored spherical polymer particles according to the present invention.
Figure 10:
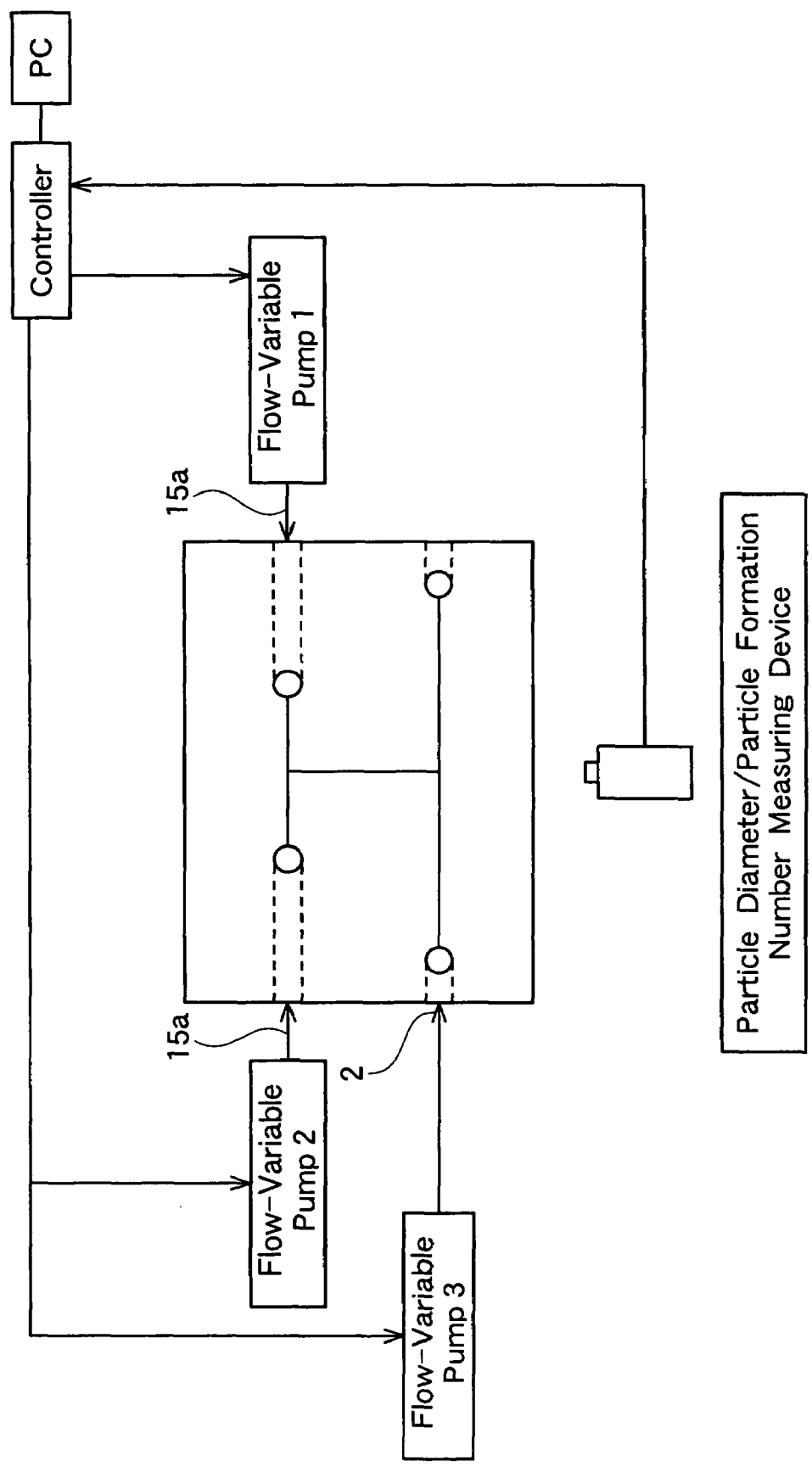
FIG. 10 is a system diagram of numeric control.

Furthermore, in the present invention, a microchannel-type apparatus for mass production of colored spherical particles as shown in FIG. 8 can be provided. As can be seen from FIG. 8, in this microchannel-type apparatus for mass production of colored spherical particles, a plurality of sets of a combination of a first microchannel 1 with a second microchannel 2 provided on both sides of the first microchannel 1 so as to be in close contact with the first microchannel 1 are juxtaposed in a compact form on the same plane. Further, in the present invention, apparatus systems as shown in FIGS. 9 (a), 9 (b), and 9 (c) (conceptual views) can be provided. As can be seen from FIG. 9, a plurality of second microchannels through which a spheroidizing phase flows for spheroidizing a colored continuous phase discharged from a first microchannel are arranged in a lateral direction [see FIGS. 9 (a) and 9 (b)] or are vertically stacked in multistage [see FIG. 9 (c)]. Thus, the provision of the first microchannel so as to be common to the second microchannels can realize the mass production of colored spherical polymer particles. In the mass production of the colored spherical particles, a conventional numerical control system (see FIG. 10) particularly for regulating the particle diameter and the number of particles produced and the like can be properly incorporated in the microchannel-type apparatus for mass-producing colored spherical polymer particles according to the present invention.

The present invention will be described in more detail with reference to the following examples. The present invention, however, is not intended to be limited thereby.

EXAMPLE 1

One part by weight of carbon black (MA-100, manufactured by Mitsubishi Chemical Corporation) as a colorant was dispersed in a polymerizable monomer component composed of 100 parts by weight of butyl acrylate and one part by weight of trimethylolpropane triacrylate in a sand mill. 0.5 part of lauroyl peroxide as a radical polymerization initiator was dissolved in the dispersion to prepare a reactive solution A for a colored continuous phase.

Next, a solution of one part by weight of 88% saponified Δpolyvinyl alcohol (PVA 235, manufactured by Kuraray Co., Ltd.) dissolved in 100 parts by weight of ion-exchanged water was provided as an aqueous fluid medium B.

A microchannel was used as an experimental apparatus in which first and second microchannels crossed in a T form as shown in FIG. 1 (*a*). The first microchannel is a channel having a square section of a size of 0.1 mm in length and 0.1 mm in width, and the second microchannel is a channel having a rectangular section of a size of 0.1 mm in length and 0.2 mm in width.

From the first microchannel side in the microchannels crossing each other in a T form as shown in FIG. 1 (*a*), the solution A was then discharged at a flow rate of 0.1 (ml/hr) into the fluid medium B which flows through the second microchannel at a flow rate of 50 (ml/hr). Thereafter, the mixture was allowed to flow through a polytetrafluoroethylene (PTFE) tube having a tube inner diameter of 1 mm while passage through a warm water bath of 90° C. for polymerization. The above procedure provided black fine polymer particles having a uniform particle diameter. The particle diameter was 40 μm, and the CV value was 12%.

EXAMPLE 2

0.3 part by weight of carbon black (MA-100, manufactured by Mitsubishi Chemical Corporation) as a colorant was dispersed in a polymerizable monomer component 1 composed of 100 parts by weight of isobornyl acrylate and one part by weight of trimethylolpropane triacrylate in a sand mill. 0.5 part of benzophenone as a UV polymerization initiator was dissolved in the dispersion to prepare a reactive solution A-1 for a colored continuous phase.

Next, 0.3 part by weight of titanium white (R-550, manufactured by Ishihara Sangyo Kaisha Ltd.) as a colorant was dispersed in a polymerizable monomer component 2 composed of 100 parts by weight of isobornyl acrylate and one part by weight of trimethylolpropane triacrylate in a sand mill. 0.5 part of benzophenone as a UV polymerization initiator was dissolved in the dispersion to prepare a reactive solution A-2 for a colored continuous phase.

Next, a solution of one part by weight of 88% saponified polyvinyl alcohol dissolved in 100 parts by weight of ion-exchanged water was provided as an aqueous fluid medium B.

Regarding an experimental apparatus, for mixing the monomers together, in an apparatus shown in FIG. 3 (*a*), the reactive solution A-1 and the reactive solution A-2 were allowed to flow into each other to form a solution A. Next, in the microchannel apparatus shown in FIG. 1 (*a*) in which first and second microchannels crossed each other in a T form, the solution A was discharged at a flow rate of 2 (ml/hr) from the first microchannel side into the second microchannel through which the fluid medium B flows at a flow rate of 10 (ml/hr). Thereafter, the mixture was allowed to flow into a glass tube having a tube inner diameter of 1 mm while exposure to ultraviolet light from a 100-W high pressure mercury lamp at 100 mW/cm$^2$ for 160 sec for polymerization.

The above procedure provided black/white fine polymer particles having a uniform particle diameter. The particle diameter was 160 μm, and the CV value was 5%.

EXAMPLE 3

One part by weight of carbon black (MA-100, manufactured by Mitsubishi Chemical Corporation) as a colorant was dispersed in a polymerizable monomer component 1 composed of 100 parts by weight of isobornyl acrylate and one part by weight of trimethylolpropane triacrylate in a sand mill. 0.5 part of cumyl peroxyneodecanate as a thermal polymerization initiator was dissolved therein to prepare a reactive solution A-1 for a colored continuous phase.

Next, one part by weight of titanium white (R-550, manufactured by Ishihara Sangyo Kaisha Ltd.) as a colorant was dispersed in a polymerizable monomer component 2 composed of 100 parts by weight of butyl acrylate and one part by weight of trimethylolpropane triacrylate in a sand mill. 0.5 part of cumyl peroxyneodecanate as a thermal polymerization initiator was dissolved in the dispersion to prepare a reactive solution A-2 for a colored continuous phase.

Next, a solution of one part by weight of 88% saponified polyvinyl alcohol dissolved in 100 parts by weight of ion-exchanged water was provided as an aqueous fluid medium B.

Regarding an experimental apparatus, for mixing the monomers together, in an apparatus shown in FIG. 4, the *reactive solution A-1 and the reactive solution A-2 were allowed to flow into each other to form a solution A. Next, in a microchannel apparatus in which three microchannels, first to three microchannels, crossed one another, the solution A was discharged, from the first microchannel located at the center of the crossed microchannels, at a flow rate of 1 (ml/hr) into the fluid medium B which flows at a flow rate of 30 (ml/hr) through the third and fourth microchannels located on respective both sides of the first microchannel, followed by passage through a PTFE tube having a tube inner diameter of 1 mm while passage through a warm water bath of 90° C. for polymerization. The above procedure provided black/white fine polymer particles having a uniform particle diameter. The particle diameter was 100 μm, and the CV value was 2%.

EXAMPLE 4

Partial Polymerization, UV 0.2 part by weight of benzophenone and 0.5 part of normal dodecylmercaptan as a molecular weight regulator were added to a polymerizable monomer component 1 composed of 100 parts by weight of isobornyl acrylate, followed by exposure to ultraviolet light from black light for 20 sec to prepare a partial polymer having a polymer content of 45% and a viscosity of 100 cp. 0.3 part by weight of carbon black (MA-230, manufactured by Mitsubishi Chemical Corporation) as a colorant was dispersed in the partial polymer in a sand mill. 0.5 part of benzophenone as a UV polymerization initiator was dissolved in the dispersion to prepare a reactive solution A-1 for a colored continuous phase.

Next, 0.2 part by weight of benzophenone and 0.5 part of normal dodecylmercaptan as a molecular weight regulator were added to a polymerizable monomer component 2 composed of 100 parts by weight of isobornyl acrylate, and the mixture was exposed to ultraviolet light from black light for 20 sec to prepare a partial polymer having a polymer content of 45% and a viscosity of 130 cp. 0.3 part by weight of titanium white (R-820, manufactured by Ishihara Sangyo Kaisha Ltd.) as a colorant was dispersed in the partial polymer in a sand mill. 0.5 part of benzophenone as a UV polymerization initiator was dissolved in the dispersion to prepare a reactive solution A-2 for a colored continuous phase.

Next, a solution of one part by weight of 88% saponified polyvinyl alcohol dissolved in 100 parts by weight of ion-exchanged water was provided as an aqueous fluid medium B.

Regarding an experimental apparatus, for mixing the monomers together, in an apparatus shown in FIG. 3 (a), the reactive solution A-1 and the reactive solution A-2 were allowed to flow into each other to form a solution A. Next, in the microchannel apparatus shown in FIG. 1 (a) in which first and second microchannels crossed each other in a T form, the solution A was discharged at a flow rate of 0.1 (ml/hr) from the first microchannel side into the second microchannel through which the fluid medium B flows at a flow rate of 100 ml/hr. Thereafter, the mixture was allowed to flow into a glass tube having a tube inner diameter of 1 mm while exposing to ultraviolet light from a 100-W high pressure mercury lamp at 100 mW/cm$^2$ for 20 sec for polymerization.

The above procedure provided black/white fine polymer particles having a uniform particle diameter. The particle diameter was 20 μm, and the CV value was 5%.

EXAMPLE 5

One part by weight of carbon black (MA-100, manufactured by Mitsubishi Chemical Corporation) as a colorant was dispersed in a polymerizable monomer component 1 composed of 100 parts by weight of tolyloxyethyl acrylate and one part by weight of trimethylolpropane triacrylate in a sand mill. 0.5 part of benzoyl peroxide as a thermal polymerization initiator was dissolved in the dispersion to prepare a reactive solution A-1 for a colored continuous phase.

Next, 5 parts by weight of PTFE powder as a colorant was dispersed in a polymerizable monomer component 2 composed of 100 parts by weight of perfluoroalkyl (FA-108; manufactured by Kyoeisha Chemical Co., Ltd.) and one part by weight of trimethylolpropane triacrylate in a sand mill. 0.5 part of cumyl peroxyneodecanate as a thermal polymerization initiator was dissolved in the dispersion to prepare a reactive solution A-2 for a colored continuous phase.

Next, a solution of one part by weight of 88% saponified polyvinyl alcohol dissolved in 100 parts by weight of ion-exchanged water was provided as an aqueous fluid medium B.

Regarding an experimental apparatus, for mixing the monomers together, in an apparatus shown in FIG. 3 (b), the reactive solution A-1 and the reactive solution A-2 were allowed to flow into each other to form a solution A. Next, in the microchannel apparatus shown in FIG. 2 in which first to fourth microchannels crossed one another, the solution A was discharged at a flow rate of 0.5 (ml/hr) from the first microchannel side located at the center into the fluid medium B which flows at a flow rate of 10 (ml/hr) through the third and fourth microchannels located on respective both sides of the first microchannel, and the mixture was then allowed to flow into a PTFE tube having a tube inner diameter of 1 mm while passage through a warm water bath of 90° C. for polymerization. The above procedure provided black/white fine polymer particles having a uniform particle diameter. The particle diameter was 200 μm, and the CV value was 3%.

EXAMPLE 6

2 parts by weight of carbon black (MA-100, manufactured by Mitsubishi Chemical Corporation) as a colorant was dispersed in a polymerizable monomer component 1 composed of 100 parts by weight of ethylenediamine in a sand mill. 0.1 part of dibutyltin laurate as a polymerization accelerator was dissolved in the dispersion to prepare a reactive solution A-1 for a colored continuous phase.

Likewise, 2 parts by weight of titanium white (R-820, manufactured by Ishihara Sangyo Kaisha Ltd.) as a colorant was then dispersed in a polymerizable monomer component 2 composed of 100 parts by weight of ethylenediamine in a sand mill. 0.1 part of dibutyltin laurate was dissolved in the dispersion as a polymerization initiator to prepare a reactive solution A-2 for a colored continuous phase.

Next, a solution of one part by weight of 88% saponified polyvinyl alcohol and hexamethylenediamine dissolved in 100 parts by weight of ion-exchanged water was provided as an aqueous fluid medium B.

Regarding an experimental apparatus, for mixing the monomers together, in an apparatus shown in FIG. 3 (a), the reactive solution A-1 and the reactive solution A-2 were allowed to flow into each other to form a solution A. Next, in the microchannel apparatus shown in FIG. 1 (a) in which first and second microchannels crossed each other in a T form, the solution A was discharged at a flow rate of 5 (ml/hr) from the first microchannel side into the second microchannel through which the fluid medium B flows at a flow rate of 100 (ml/hr). Thereafter, the mixture was placed in a small glass vessel with an agitator, followed by curing in a water bath at 80° C. for 30 min. The above procedure provided black/white fine polymer particles having a uniform particle diameter. The particle diameter was 100 μm, and the CV value was 20%.

EXAMPLE 7

A microchannel-type mass production apparatus as shown in FIG. 6 (width of channels such as first and second microchannels and side microchannels: 115 μm, channel depth: 37.5 μm) was provided. Colored spherical particles having two hues of black and white were mass-produced using this apparatus. A two-color colored continuous phase of two hues was prepared as follows. A dispersion of 20% titanium oxide (R-820) in an isobornyl acrylate monomer medium was provided as one single-color colored continuous phase. A dispersion of 10% carbon black in an isobornyl acrylate monomer medium was provided as another single-color colored continuous phase. These colored continuous phases each were supplied at a flow rate of 0.05 (ml/hr), and a spheroidizing phase was supplied at a flow rate of 1 (ml/hr), followed by discharge of the mixture into a recovery tank through four discharge ports, whereby colored spherical particles having two hues of white and black with an average particle diameter of 80 μm could be continuously mass-produced.

As described above, colored spherical resin particles of one hue, two hues, or three hues having an average particle diameter of 1 to 400 μm and possessing excellent monodispersibility can be provided by using a colored continuous phase(s) and a spheroidizing phase in an O/W or W/O relationship in combination with a microchannel-type production apparatus using a combination of a plurality of microchannels according to the present invention.

Further, according to the present invention, since a microchannel-type production apparatus having a high mass production capability can easily be provided, the application of the present invention in electrophotographic image apparatuses such as copying machines, facsimile, and laser printers and particularly as two-color colored spherical particles can provide spherical color particles having a desired hue in image displays and/or print displays in PLDs and other color display devices and the like.

The invention claimed is:

1. A process for producing colored spherical polymer particles using microchannels including a first microchannel through which a colored continuous phase is transferred and a second microchannel through which a spheroidizing phase of a fluid medium flows, said colored continuous phase and said spheroidizing phase being in an O/W (oil-in-water) or W/O (water-in-oil) relationship with each other, said colored continuous phase of one or at least two colors being successively discharged from said first microchannel into said spheroidizing phase to form colored spherical polymer particles, which process comprises the steps of:

transferring said colored continuous phase comprising an oily or aqueous fluid medium containing a polymerizable resin component and further containing a color dye/pigment insoluble in said medium into said first microchannel;

then successively discharging said colored continuous phase into said aqueous or oily spheroidizing phase flowing through said second microchannel either continuously or intermittently; and then polymerizing and curing said polymerizable resin component in said spheroidizing phase while successively spheroidizing said discharged colored continuous phase in said spheroidizing phase.

2. The process for producing colored spherical polymer particles using microchannels according to claim 1, wherein said polymerizable resin component is polymerized and cured under UV irradiation and/or heating.

3. The process for producing colored spherical polymer particles using microchannels according to claim 1, wherein a colored continuous phase comprising dyes/pigments of two or three different colors in respective separated phases is formed as the colored continuous phase within said first microchannel and is then discharged into said spheroidizing phase to successively form colored spherical polymer particles having two color or three color phases.

4. The process for producing colored spherical polymer particles using microchannels according to claim 1, wherein said colored continuous phase comprises separated phases of two or three colors selected from achromatic colors including white and black or chromatic colors including red, blue, green, purple, and yellow.

5. The process for producing colored spherical polymer particles using microchannels according to claim 4, wherein said polymerizable resin components constituting two separated phases in said colored continuous phase are polymerizable monomers, one of which is positively electrifiable and the other is negatively electrifiable, and said spherical polymer particles with two color phases are designed to have electrification characteristics of a positive electrode and/or a negative electrode.

6. The process for producing colored spherical polymer particles using microchannels according to claim 4, wherein said polymerizable resin component constituting two separated phases in said colored continuous phase are a polymerizable resin component with positively magnetizable powder and negatively magnetizable powder dispersed therein and said spherical polymer particles with two color phases are designed to have electrification characteristics of a positive electrode and/or a negative electrode.

7. The process for producing colored spherical polymer particles using microchannels according to claim 1, wherein spheroidization is carried out so that the volume average particle diameter is in the range of 1 to 400 μm and the degree of distribution of the average particle diameter is not more than 5% in terms of relative standard deviation value.

8. The process for producing colored spherical polymer particles using microchannels according to claim 2, wherein spheroidization is carried out so that the volume average particle diameter is in the range of 1 to 400 μm and the degree of distribution of the average particle diameter is not more than 5% in terms of relative standard deviation value.

9. The process for producing colored spherical polymer particles using microchannels according to claim 3, wherein spheroidization is carried out so that the volume average particle diameter is in the range of 1 to 400 μm and the degree of distribution of the average particle diameter is not more than 5% in terms of relative standard deviation value.

10. The process for producing colored spherical polymer particles using microchannels according to claim 4, wherein spheroidization is carried out so that the volume average particle diameter is in the range of 1 to 400 μm and the degree of distribution of the average particle diameter is not more than 5% in terms of relative standard deviation value.

11. The process for producing colored spherical polymer particles using microchannels according to claim 5, wherein spheroidization is carried out so that the volume average particle diameter is in the range of 1 to 400 μm and the degree of distribution of the average particle diameter is not more than 5% in terms of relative standard deviation value.

12. The process for producing colored spherical polymer particles using microchannels according to claim 6, wherein spheroidization is carried out so that the volume average particle diameter is in the range of 1 to 400 μm and the degree of distribution of the average particle diameter is not more than 5% in terms of relative standard deviation value.

* * * * *